(12) United States Patent
Park et al.

(10) Patent No.: US 11,864,109 B2
(45) Date of Patent: Jan. 2, 2024

(54) WAKE-UP SIGNAL OPERATION FOR MULTIPLE TRANSMISSION AND RECEPTION POINTS

(71) Applicant: QUALCOMM Incorporated, San Diego, CA (US)

(72) Inventors: Sungwoo Park, San Diego, CA (US); Mostafa Khoshnevisan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 16/802,445

(22) Filed: Feb. 26, 2020

(65) Prior Publication Data

US 2020/0288399 A1  Sep. 10, 2020

Related U.S. Application Data

(60) Provisional application No. 62/813,673, filed on Mar. 4, 2019.

(51) Int. Cl.
*H04W 52/02* (2009.01)
*H04W 76/27* (2018.01)
(Continued)

(52) U.S. Cl.
CPC ....... *H04W 52/0229* (2013.01); *H04W 76/27* (2018.02); *H04W 76/28* (2018.02); *H04W 80/02* (2013.01)

(58) Field of Classification Search
CPC . H04W 52/0229; H04W 76/27; H04W 80/02; H04W 76/28; H04W 68/00; H04W 52/0235; H04W 52/0216; Y02D 30/70
See application file for complete search history.

(56) References Cited

U.S. PATENT DOCUMENTS

2019/0254110 A1* 8/2019 He .................. H04W 76/28
2020/0029274 A1* 1/2020 Cheng ............. H04W 72/042
(Continued)

FOREIGN PATENT DOCUMENTS

WO  WO-2018082402 A1  5/2018
WO  WO-2018175760 A1  9/2018

OTHER PUBLICATIONS

3GPP TSG RAN WG1 Meeting #90 ;R1-1714511, Source: Samsung, Title: Discussion on group-based beam reporting, Prague, Czech, Jun. 21-25, 2017. (Year: 2017).*

(Continued)

*Primary Examiner* — Mohammed S Chowdhury
(74) *Attorney, Agent, or Firm* — Holland & Hart LLP

(57) ABSTRACT

Methods, systems, and devices for wireless communications are described. Generally, the described techniques provide for efficiently monitoring for wake-up signaling from one or more transmission and reception points (TRPs), the wake-up signaling indicating the presence of data or control information in an on-duration state of a discontinuous reception (DRX) cycle. In particular, select TRPs may be used to transmit wake-up signaling to a user equipment (UE), and the UE may be configured to monitor for wake-up signaling from the select TRPs. Once the UE receives wake-up signaling prior to an on-duration state of a DRX cycle from any of the select TRPs, the UE may then determine the TRPs scheduled to transmit data or control information in the on-duration state (e.g., based on the WUS or based on further control signaling), and the UE may receive the data or control information from the TRPs in the on-duration state.

13 Claims, 17 Drawing Sheets

(51) Int. Cl.
*H04W 80/02* (2009.01)
*H04W 76/28* (2018.01)

(56) References Cited

U.S. PATENT DOCUMENTS

| | | | |
|---|---|---|---|
| 2020/0037247 A1* | 1/2020 | Liao | H04W 72/0453 |
| 2020/0053649 A1 | 2/2020 | Yao et al. | |
| 2020/0092814 A1* | 3/2020 | Zhou | H04W 80/02 |
| 2020/0229092 A1* | 7/2020 | Wu | H04W 76/11 |
| 2021/0076324 A1* | 3/2021 | Kaikkonen | H04W 24/08 |
| 2021/0204214 A1* | 7/2021 | Chang | H04W 52/0229 |
| 2022/0039010 A1* | 2/2022 | Takeda | H04W 72/0453 |

OTHER PUBLICATIONS

3GPP TSG RAN WG1 Meeting#90; R1-1714512; Source: Samsung; Title: Discussion on Tx beam grouping configuration for multi-panel TRP and multi-TRP, Prague, Czech, Aug. 21-25, 2017. (Year: 2017).*

3GPP TSG RAN WG1 Meeting #96; R1-1901567; Source: Huawei, HiSilicon, Title: Enhancements on Multi-TRP/panel transmission, Athens, Greece, Feb. 25-Mar. 1, 2019. (Year: 2019).*

Ericsson: "Wake-up Signal Configurations and Procedures for NB-IoT", 3GPP Draft, 3GPP TSG-RAN WG1 Meeting #92, R1-1804153 Wake-up Signal Configurations and Procedures for NB-IoT, 3rd Generation Partnership Project (3GPP), Mobile Competence Centre, 650, Route Des Lucioles, F-06921, Sophia-Antipolis, vol. RAN WG1, No. Sanya, P.R. China, Apr. 16, 2018-Apr. 20, 2018, Apr. 15, 2018 (Apr. 15, 2018), XP051426441, pp. 1-9, Retrieved from the Internet: URL: http://www.3gpp.org/ftp/Meetings%5F3GPP%5FSYNC/RAN1/Docs/, [retrieved on Apr. 15, 2018], the whole document.

International Search Report and Written Opinion—PCT/US2020/020196—ISAEPO—dated Jun. 17, 2020 (191673WO).

* cited by examiner

WAKE-UP SIGNAL OPERATION FOR MULTIPLE TRANSMISSION AND RECEPTION POINTS

CROSS REFERENCE

The present application for patent claims the benefit of U.S. Provisional Patent Application No. 62/813,673 by PARK et al., entitled "WAKE-UP SIGNAL OPERATION FOR MULTIPLE TRANSMISSION AND RECEPTION POINTS," filed Mar. 4, 2019, assigned to the assignee hereof, and expressly incorporated herein.

INTRODUCTION

The following relates to wireless communications and more specifically to managing wake-up signal (WUS) operations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support operation in a discontinuous reception (DRX) mode, where the UE may transition to a sleep mode and wake up periodically to monitor for data or control information from a base station in accordance with a DRX cycle. As such, the UE may save power since the UE may not have to constantly stay awake or constantly monitor for data or control information from the base station. In such systems, to further limit power consumption, a UE may be configured to only wake up in an on-duration of a DRX cycle when the UE receives a WUS from the base station prior to or at the beginning of the on-duration. However, conventional techniques for monitoring for wake-up signaling may be deficient.

SUMMARY

A method for wireless communication at a UE is described. The method may include receiving a wake-up signal configuration (e.g., from a base station or a network entity associated with a base station), the wake-up signal configuration indicating at least one transmission/reception point of a set of transmission/reception points from which the UE is to monitor for wake-up signals, monitoring for wake-up signaling from the at least one transmission/reception point based on the wake-up signal configuration, the wake-up signaling being for a discontinuous reception cycle, receiving at least one wake-up signal prior to or at the beginning of an on duration state in the discontinuous reception cycle based on the monitoring, the at least one wake-up signal indicating a presence of information (e.g., data or control information) in the on duration state, and waking up for the UE to receive the information in the on duration state based on receiving the at least one wake-up signal.

An apparatus for wireless communication at a UE is described. The apparatus may include a processor and memory coupled to the processor. The processor and memory configured to receive a wake-up signal configuration. The wake-up signal configuration indicating at least one transmission/reception point of a set of transmission/reception points from which the UE is to monitor for wake-up signals from the at least one transmission/reception point based on the wake-up signal configuration. The wake-up signaling being for a discontinuous reception cycle. The processor and memory configured to receive at least one wake-up signal prior to or at the beginning of an on duration state in the discontinuous reception cycle based on the monitoring. The at least one wake-up signal indicating a presence of information in the on duration state. The processor and memory configured to wake up for the UE to receive the information in the on duration state based on receiving the at least one wake-up signal.

Another apparatus for wireless communication at a UE is described. The apparatus may include means for receiving a wake-up signal configuration, the wake-up signal configuration indicating at least one transmission/reception point of a set of transmission/reception points from which the UE is to monitor for wake-up signals, monitoring for wake-up signaling from the at least one transmission/reception point based on the wake-up signal configuration, the wake-up signaling being for a discontinuous reception cycle, receiving at least one wake-up signal prior to or at the beginning of an on duration state in the discontinuous reception cycle based on the monitoring, the at least one wake-up signal indicating a presence of information in the on duration state, and waking up for the UE to receive the information in the on duration state based on receiving the at least one wake-up signal.

A non-transitory computer-readable medium storing code for wireless communication at a UE is described. The code may include instructions executable by a processor to receive a wake-up signal configuration, the wake-up signal configuration indicating at least one transmission/reception point of a set of transmission/reception points from which the UE is to monitor for wake-up signals, monitor for wake-up signaling from the at least one transmission/reception point based on the wake-up signal configuration, the wake-up signaling being for a discontinuous reception cycle, receive at least one wake-up signal prior to or at the beginning of an on duration state in the discontinuous reception cycle based on the monitoring, the at least one wake-up signal indicating a presence of information in the on duration state, and wake up for the UE to receive the information in the on duration state based on receiving the at least one wake-up signal.

In some examples of the method, apparatuses, and non-transitory computer-readable medium described herein, the at least one transmission/reception point may include operations, features, means, or instructions for monitoring for a wake-up signal from the anchor transmission/reception point. In some examples of the method, apparatuses, and non-transitory computer-readable medium described herein, receiving the at least one wake-up signal may include operations, features, means, or instructions for receiving a wake-up signal from the anchor transmission/reception point, the wake-up signal indicating the presence of data or control information in the on-duration state. In some examples of the method, apparatuses, and non-transitory computer-readable medium described herein, waking up for the UE to receive the data or control information in the on-duration state may include operations, features, means, or instructions for turning on panels at the UE used to receive signals from the set of transmission/reception points to receive the data or control information in the on-duration state.

In some examples of the method, apparatuses, and non-transitory computer-readable medium described herein, waking up for the UE to receive the data or control information in the on-duration state may include operations, features, means, or instructions for turning on a panel at the UE used to receive signals from the anchor transmission/reception point, receiving a control message in the on-duration state from the anchor transmission/reception point using the panel after waking up in the on-duration state, the control message indicating a subset of the set of transmission/reception points from which the UE may be to monitor for the data or control information in the on-duration state, and turning on panels at the UE used to receive signals from the subset of the set of transmission/reception points to receive the data or control information in the on-duration state.

Some examples of the method, apparatuses, and non-transitory computer-readable medium described herein may further include operations, features, means, or instructions for initiating an inactivity timer upon turning on the panels at the UE used to receive signals from the subset of the set of transmission/reception points, and turning off the panels used at the UE to receive signals from the subset of the set of transmission/reception points when the inactivity timer expires. Some examples of the method, apparatuses, and non-transitory computer-readable medium described herein may further include operations, features, means, or instructions for receiving another control message indicating that the UE may be to turn off the panels at the UE used to receive signals from the subset of the set of transmission/reception points, and turning off the panels at the UE used to receive signals from the subset of the set of transmission/reception points based on receiving the other control message. In some examples of the method, apparatuses, and non-transitory computer-readable medium described herein, the control message includes a medium access control (MAC) control element (MAC-CE), a downlink control information (DCI) message, or a radio resource control (RRC) message.

In some examples of the method, apparatuses, and non-transitory computer-readable medium described herein, the indication of the subset of the set of transmission/reception points includes an explicit indication of indices of the subset of the set of transmission/reception points or an indication of transmission configuration indication states corresponding to the indices of the subset of the set of transmission/reception points. In some examples of the method, apparatuses, and non-transitory computer-readable medium described herein, the wake-up signal further indicates a subset of the set of transmission/reception points from which the UE is to monitor for the data or control information in the on-duration state.

In some examples of the method, apparatuses, and non-transitory computer-readable medium described herein, waking up for the UE to receive the data or control information in the on-duration state may include operations, features, means, or instructions for turning on a panel at the UE used to receive signals from the anchor transmission/reception point in the on-duration state, and turning on panels at the UE used to receive signals from the subset of the set of transmission/reception points to receive the data or control information in the on-duration state. In some examples of the method, apparatuses, and non-transitory computer-readable medium described herein, the indication of the subset of the set of transmission/reception points includes an explicit indication of indices of the subset of the set of transmission/reception points or an indication of transmission configuration indication states corresponding to the indices of the subset of the set of transmission/reception points.

In some examples of the method, apparatuses, and non-transitory computer-readable medium described herein, the at least one transmission/reception point may include operations, features, means, or instructions for monitoring for wake-up signals from each of the set of transmission/reception points. In some examples of the method, apparatuses, and non-transitory computer-readable medium described herein, receiving the at least one wake-up signal may include operations, features, means, or instructions for receiving wake-up signals from a subset of the set of transmission/reception points, the wake-up signals indicating the presence of data or control information in the on-duration state and indicating the subset of the set of transmission/reception points from which the UE may be to monitor for the data or control information in the on-duration state.

In some examples of the method, apparatuses, and non-transitory computer-readable medium described herein, waking up for the UE to receive the data or control information in the on-duration state may include operations, features, means, or instructions for turning on panels at the UE used to receive signals from the subset of the set of transmission/reception points to receive the data or control information in the on-duration state from the subset of the set of transmission/reception points. Some examples of the method, apparatuses, and non-transitory computer-readable medium described herein may further include operations, features, means, or instructions for turning on panels at the UE used to receive signals from the set of transmission/reception points to receive the data or control information in the on-duration state from the subset of the set of transmission/reception points. In some examples of the method, apparatuses, and non-transitory computer-readable medium described herein, the indication of the at least one transmission/reception point of the set of transmission/reception points includes an explicit indication of indices of the at least one transmission/reception point or an indication of transmission configuration indication states corresponding to the indices of the at least one transmission/reception point.

A method for wireless communication (e.g., at a base station or a network entity associated with a base station) is described. The method may include transmitting a wake-up signal configuration to a UE, the wake-up signal configuration indicating at least one transmission/reception point of a set of transmission/reception points from which the UE is to monitor for wake-up signals, identifying information (e.g., data or control information) to transmit to the UE via a subset of the set of transmission/reception points, and transmitting at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle.

An apparatus for wireless communication is described. The apparatus may include a processor and memory coupled to the processor. The processor and memory configured to transmit a wake-up signal configuration to a UE, the wake-up signal configuration indicating at least one transmission/reception point of a set of transmission/reception points from which the UE is to monitor for wake-up signals, identify information to transmit to the UE via a subset of the set of transmission/reception points, and transmit at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle.

Another apparatus for wireless communication is described. The apparatus may include means for transmitting a wake-up signal configuration to a UE, the wake-up signal configuration indicating at least one transmission/reception point of a set of transmission/reception points from which the UE is to monitor for wake-up signals, identifying information to transmit to the UE via a subset of the set of transmission/reception points, and transmitting at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle.

A non-transitory computer-readable medium storing code for wireless communication is described. The code may include instructions executable by a processor to transmit a wake-up signal configuration to a UE, the wake-up signal configuration indicating at least one transmission/reception point of a set of transmission/reception points from which the UE is to monitor for wake-up signals, identify information to transmit to the UE via a subset of the set of transmission/reception points, and transmit at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle.

In some examples of the method, apparatuses, and non-transitory computer-readable medium described herein, the at least one transmission/reception point may include operations, features, means, or instructions for transmitting a wake-up signal to the UE via the anchor transmission/reception point, the wake-up signal indicating the presence of data or control information in the on-duration state. Some examples of the method, apparatuses, and non-transitory computer-readable medium described herein may further include operations, features, means, or instructions for transmitting a control message in the on-duration state via the anchor transmission/reception point, the control message indicating the subset of the set of transmission/reception points from which the UE may be to monitor for the data or control information in the on-duration state. Some examples of the method, apparatuses, and non-transitory computer-readable medium described herein may further include operations, features, means, or instructions for transmitting the data or control information in the on-duration state via the subset of the set of transmission/reception points.

Some examples of the method, apparatuses, and non-transitory computer-readable medium described herein may further include operations, features, means, or instructions for transmitting another control message indicating the subset of the set of transmission/reception points from which the UE may be to stop monitoring for further data or control information in the on-duration state. In some examples of the method, apparatuses, and non-transitory computer-readable medium described herein, the control message includes a MAC-CE, a DCI message, or an RRC message. In some examples of the method, apparatuses, and non-transitory computer-readable medium described herein, the indication of the subset of the set of transmission/reception points includes an explicit indication of indices of the subset of the set of transmission/reception points or an indication of transmission configuration indication states corresponding to the indices of the subset of the set of transmission/reception points.

In some examples of the method, apparatuses, and non-transitory computer-readable medium described herein, the wake-up signal further indicates the subset of the set of transmission/reception points from which the UE may be to monitor for the data or control information in the on-duration state. Some examples of the method, apparatuses, and non-transitory computer-readable medium described herein may further include operations, features, means, or instructions for transmitting the data or control information in the on-duration state via the subset of the set of transmission/reception points. In some examples of the method, apparatuses, and non-transitory computer-readable medium described herein, the indication of the subset of the set of transmission/reception points includes an explicit indication of indices of the subset of the set of transmission/reception points or an indication of transmission configuration indication states corresponding to the indices of the subset of the set of transmission/reception points. In some examples of the method, apparatuses, and non-transitory computer-readable medium described herein, the indication of the at least one transmission/reception point of the set of transmission/reception points includes an explicit indication of indices of the at least one transmission/reception point or an indication of transmission configuration indication states corresponding to the indices of the at least one transmission/reception point.

DETAILED DESCRIPTION

In some wireless communications systems, a UE may support operation in a DRX mode. While operating in a DRX mode, the UE may transition to a sleep mode in off-duration states of a DRX cycle and the UE may wake up during on-duration states of the DRX cycle to monitor for data or control information from one or more base stations. Since the UE may transition to a sleep mode in off-duration states of the DRX cycle when operating in the DRX mode, the UE may save power when operating in the DRX mode. In some cases, to further limit power consumption, the UE may be configured to only wake up in an on-duration state of the DRX cycle if the UE receives a WUS from the base station prior to the on-duration. In some cases, however, the UE may be communicating on multiple panels with multiple TRPs (e.g., operated by one or more base stations). Thus, prior to every on-duration state of a DRX cycle, the UE may have to turn on all of the multiple panels to monitor for wake-up signaling from the multiple TRPs, resulting in increased power consumption at the UE.

As described herein, a UE may support efficient techniques for monitoring for wake-up signaling prior to the on-duration of a DRX cycle when the UE is communicating on multiple panels with multiple TRPs. In particular, a base station may select or identify (e.g., based on a trigger from a UE) certain TRPs that may transmit wake-up signaling to a UE, and the base station may configure the UE to monitor for wake-up signaling from these selected or identified TRPs. As such, the UE may be configured to monitor for wake-up signaling from a subset of all of the TRPs with which the UE is communicating, and the wake-up signaling may indicate the presence of data or control information in an on-duration of a DRX cycle (e.g., where the data or control information may be from any of the TRPs with which the UE is communicating). Once the UE receives wake-up signaling prior to or at the beginning of an on-duration of a DRX cycle from any of the subset of TRPs, the UE may determine the TRPs scheduled to transmit data or control information in the on-duration (e.g., based on the WUS or based on further control signaling), and the UE may turn on the appropriate panels to receive the data or control information from the TRPs in the on-duration.

Aspects of the disclosure introduced above are described below in the context of a wireless communications system. Examples of processes and signaling exchanges that support WUS operation for multiple TRPs are then described. Aspects of the disclosure are further illustrated by and described with reference to apparatus diagrams, system diagrams, and flowcharts that relate to WUS operation for multiple TRPs.

Figure 1:
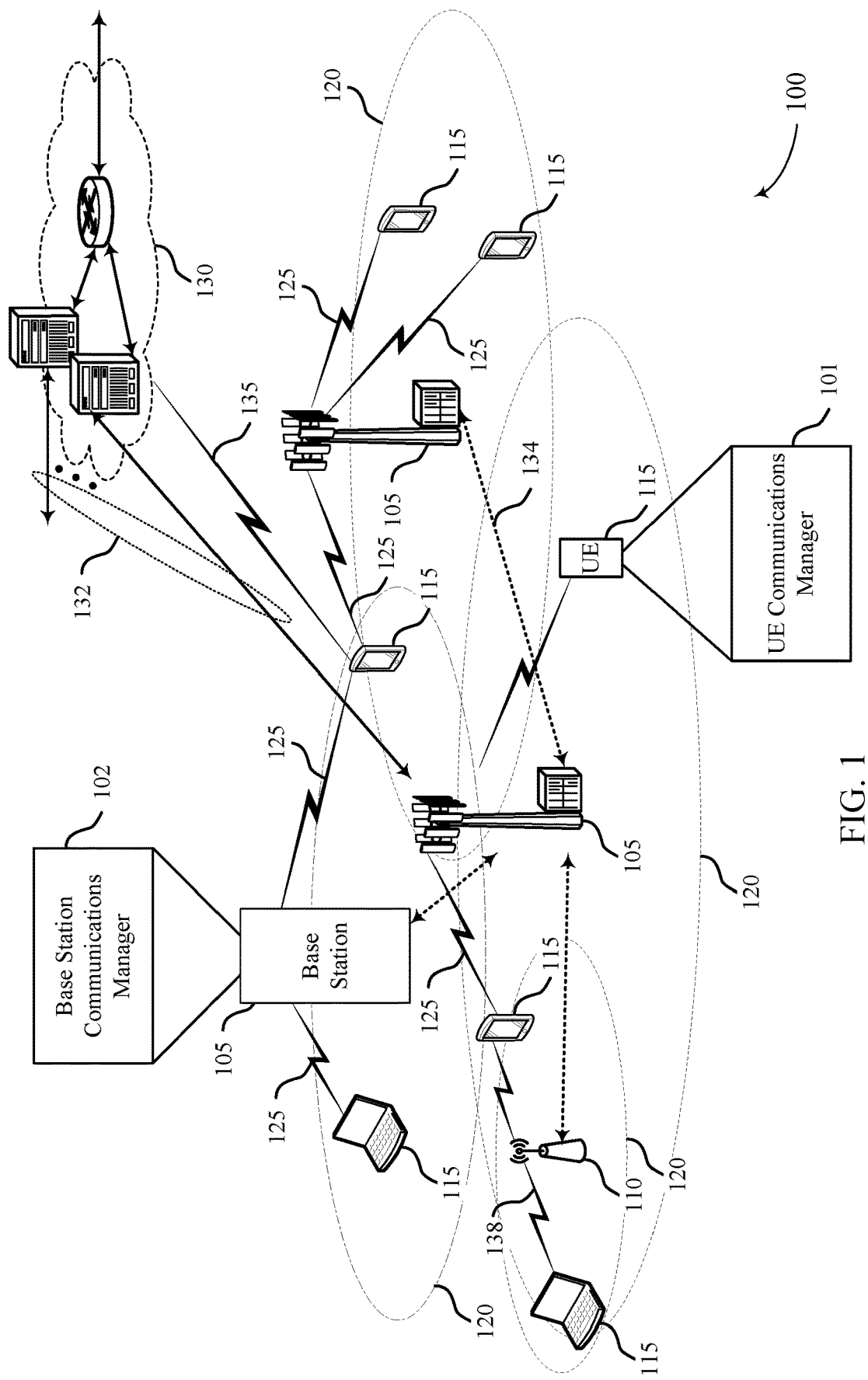
FIG. 1 illustrates an example of a wireless communications system that supports WUS operation for multiple TRPs in accordance with one or more aspects of the present disclosure.

FIG. 1 illustrates an example of a wireless communications system 100 that supports WUS operation for multiple TRPs in accordance with one or more aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink shared channel (PUSCH) or a physical uplink control channel (PUCCH)), or downlink transmissions from a base station 105 to a UE 115 (e.g., in a physical downlink shared channel (PDSCH) or a physical downlink control channel (PDCCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode) or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). A UE 115 may communicate with the core network 130 through communication link 135.

UE 115 may include UE communications manager 101, which may receive a WUS configuration from a base station 105, the WUS configuration indicating at least one TRP of a plurality of TRPs from which the UE 115 is to monitor for WUSs, monitor for wake-up signaling from the at least one TRP based at least in part on the WUS configuration, the wake-up signaling being for a DRX cycle, receive at least one WUS prior to or at the beginning of an on-duration state in the DRX cycle based at least in part on the monitoring, the at least one WUS indicating a presence of data or control information in the on-duration state, and wake up for the UE 115 to receive the data or control information in the on-duration state based at least in part on receiving the at least one wake-up signal.

Base station 105 may include base station communications manager 102, which may transmit a WUS configuration to a UE 115, the WUS configuration indicating at least one TRP of a plurality of TRPs from which the UE 115 is to monitor for WUSs, identify data or control information to transmit to the UE 115 via a subset of the plurality of TRPs, and transmit at least one WUS to the UE prior to or at the beginning of an on-duration state in a DRX cycle via one or more of the at least one TRP, the at least one WUS indicating a presence of the data or control information in the on-duration state of the DRX cycle.

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that may operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Figure 2:
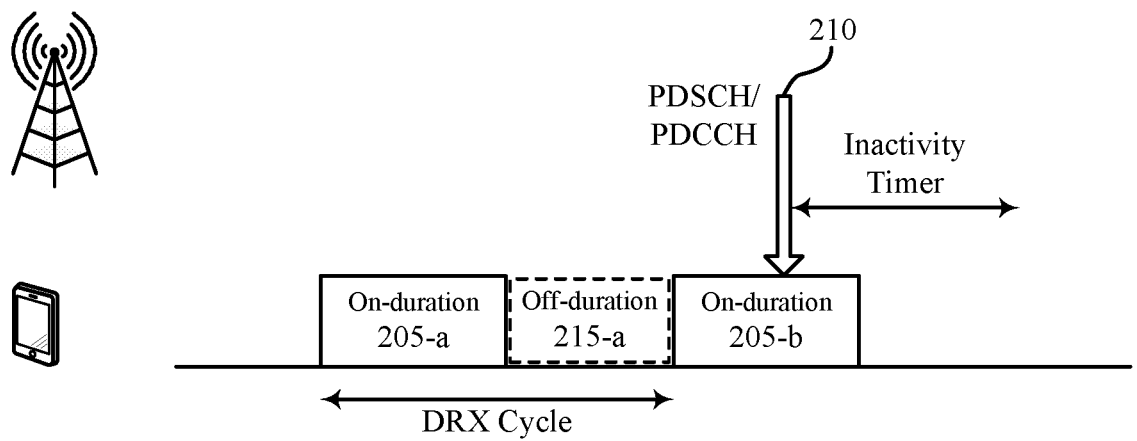
FIG. 2 illustrates an example of a DRX cycle.

In wireless communications system 100, a UE 115 may support operation in a DRX mode (e.g., connected mode DRX (C-DRX)). While operating in a DRX mode, the UE 115 may transition to a sleep mode in off-duration states of a DRX cycle, and the UE 115 may wake up during on-duration states of the DRX cycle to monitor for data or control information from one or more base stations 105 (e.g. where the transitions between sleep and awake states may be done without signaling (i.e., signaling free transitions) and base stations 105 may only schedule data or control information transmissions in on-duration states). Since the UE 115 may transition to a sleep mode in off-duration states of the DRX cycle, the UE 115 may save power when operating in the DRX mode. For example, one or more integrated circuits (e.g., transceivers, processors, etc.) of the UE 115 may implement the methods associated with WUS operation for multiple TRPs to minimize overall power consumption for the UE 115. FIG. 2 illustrates an example of a DRX cycle 200. In the example of FIG. 2, a UE 115 may wake up during on-duration states 205, and after off-duration state 215-*a*, the UE 115 may receive data in a PDSCH or control information in a PDCCH at 210 during on-duration state 205-*b*. After receiving the data or control information, the UE 115 may initiate an inactivity timer, and, if, for the duration of the inactivity timer, the UE 115 fails to receive additional data or control information, the UE 115 may transition to a sleep mode and continue operating in the DRX mode.

Figure 3:
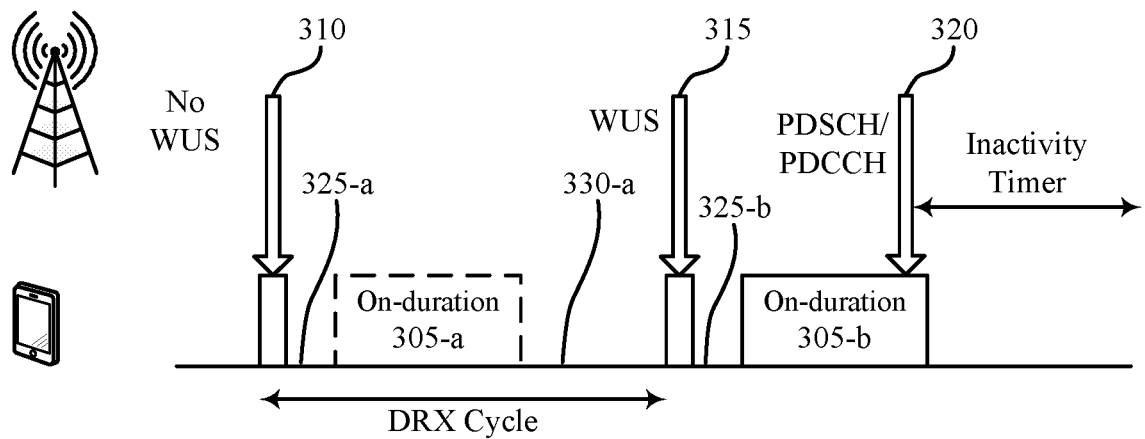
FIG. 3 illustrates an example of a DRX cycle used in combination with wake-up signaling.

In some cases, to further limit power consumption at a UE 115, the UE 115 may be configured to only wake up in an on-duration of the DRX cycle if the UE 115 receives a WUS from a base station 105 prior to or at the beginning of the on-duration. FIG. 3 illustrates an example of a DRX cycle 300 used in combination with wake-up signaling. In the example of FIG. 3, a UE 115 may be scheduled with on-duration states 305 in a DRX cycle. However, at 310, for example, the UE 115 may fail to receive a WUS (e.g., during pre-wake stage 325-*a* prior to on-duration state 305-*a*). Thus, UE 115 may avoid waking up in on-duration state 305-*a* (i.e., the UE 115 may skip the on-duration state 305-*a*) and continue to the off-duration state 330-*a* of the DRX cycle. Then, at 315, the UE 115 may receive a WUS (e.g., during pre-wake stage 325-*b* prior to on-duration state 305-*b*) indicating the presence of data or control information in on-duration state 305-*b*. Thus, the UE 115 may wake up in on-duration state 305-*b*, and, at 320, the UE 115 may receive data in a PDSCH or control information in a PDCCH in the on-duration state 305-*b*. After receiving the data or control information, the UE 115 may initiate an inactivity timer, and, if, for the duration of the inactivity timer of the DRX cycle, the UE 115 fails to receive additional data or control information, the UE 115 may transition to a sleep mode and continue operating in the DRX mode.

Figure 4:
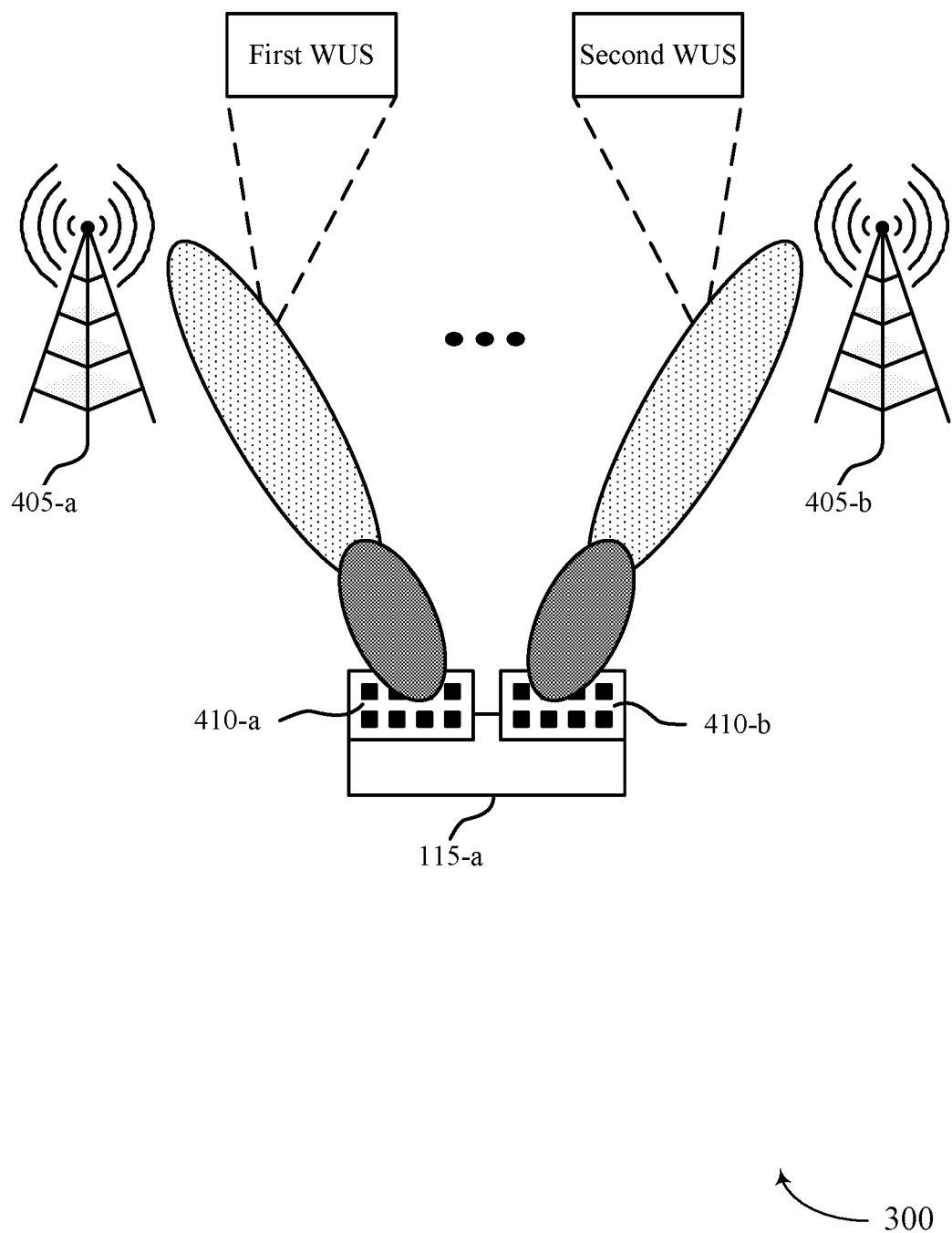
FIG. 4 illustrates an example of a wireless communications system that supports WUS operation for multiple TRPs in accordance with one or more aspects of the present disclosure.

By operating in a DRX mode based on a DRX cycle and wake-up signaling (e.g., as described with reference to FIG. 3), a UE 115 may be able to further save power by avoiding waking up in on-duration states unnecessarily. In some cases, however, a UE 115 may be communicating on multiple panels with multiple TRPs (e.g., operated by one or more base stations). In some examples, a panel may be a set of antennas (e.g., a definable unit of an antenna group). Thus, prior to every on-duration of a DRX cycle, the UE 115 may have to turn on all of the multiple panels to monitor for wake-up signaling from the multiple TRPs. FIG. 4 illustrates an example of a wireless communications system 400 in which a UE 115-*a* turns on and uses multiple panels 410 (e.g., 410-*a* and 410-*b*) to monitor for wake-up signaling from multiple TRPs 405 (e.g., 405-*a* and 405-*b*). In the example of FIG. 4, since UE 115-*a* may have to turn on and use the multiple panels 410 to monitor for wake-up signaling from the multiple TRPs 405 (i.e., during every pre-wake-up cycle), the power consumption at the UE 115-*a* may be increased. As described herein, a UE 115 in wireless communications system 100 may support efficient techniques for monitoring for wake-up signaling prior to the on-duration state of a DRX cycle when the UE is configured to communicate on multiple panels with multiple TRPs (e.g., to minimize power consumption at the UE).

Figure 5:
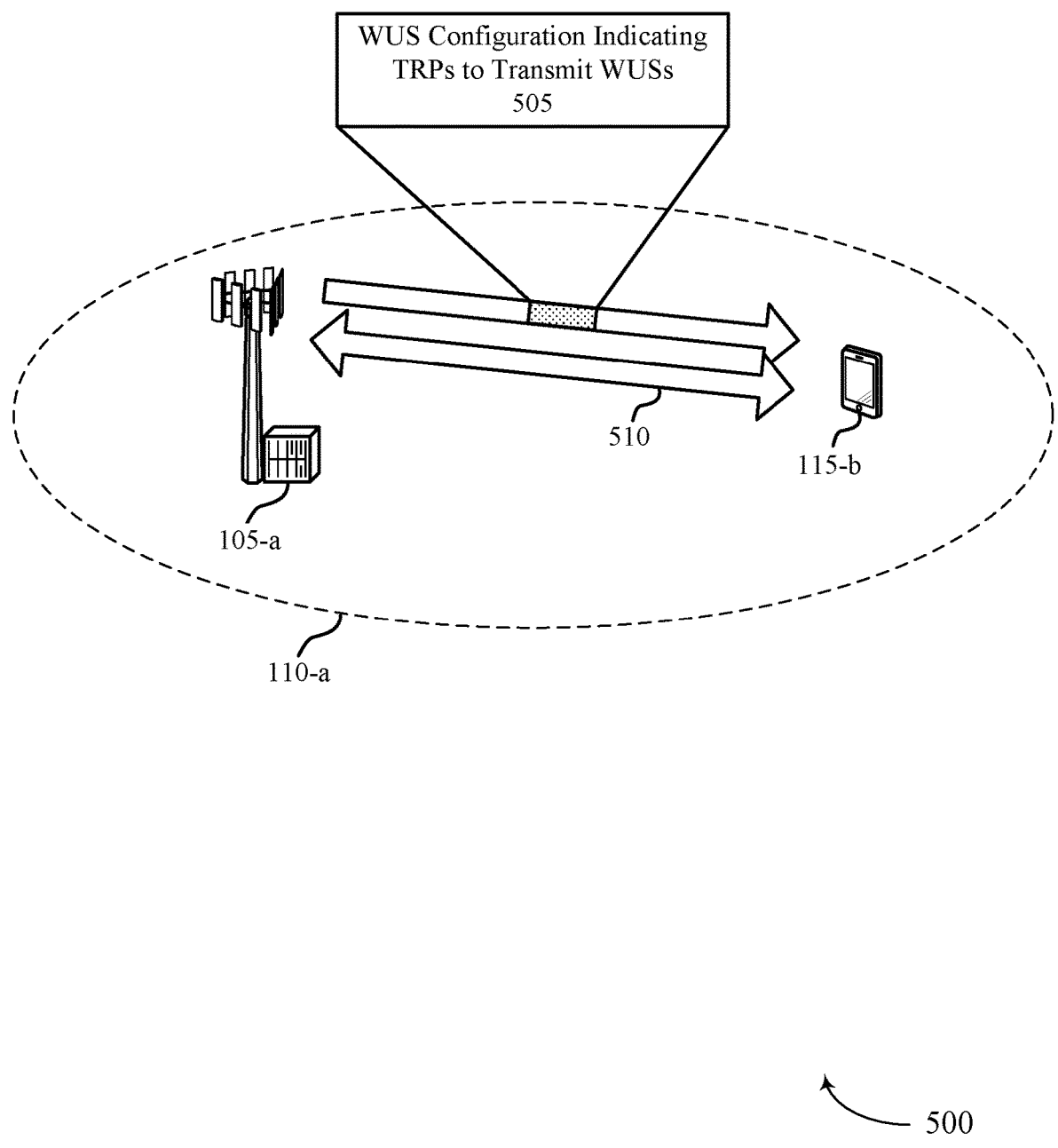
FIG. 5 illustrates an example of a wireless communications system that supports WUS operation for multiple TRPs in accordance with one or more aspects of the present disclosure.

FIG. 5 illustrates an example of a wireless communications system 500 that supports WUS operation for multiple TRPs in accordance with one or more aspects of the present disclosure. Wireless communications system 500 includes base station 105-*a*, which may be an example of a base station 105 described with reference to FIGS. 1-4. Wireless communications system 500 also includes UE 115-*b*, which may be an example of a UE 115 described with reference to FIGS. 1-4. Base station 105-*a* may provide communication coverage for a respective coverage area 110-*a*, which may be an example of a coverage area 110 described with reference to FIG. 1. Wireless communications system 500 may implement aspects of wireless communications system 100. For example, UE 115-*b* in wireless communications system 500 may support efficient techniques for monitoring for wake-up signaling prior to the on-duration of a DRX cycle when UE 115-*b* is configured to communicate on multiple panels with multiple TRPs (e.g., to minimize power consumption at UE 115-*b*).

In the example of FIG. 2, the TRPs through which a base station 105-*a* (or other base station 105) may transmit wake-up signaling to UE 115-*b* may be configurable. In particular, base station 105-*a* may select TRPs that may transmit wake-up signaling to UE 115-*b* (e.g., based on a trigger from UE 115-*b*), and base station 105-*b* may transmit a WUS configuration 505 to UE 115-*b* for a DRX cycle indicating the selected TRPs that may transmit wake-up signaling to UE 115-*b* prior to on-duration states in the DRX cycle. Thus, based on the WUS configuration, UE 115-*b* may monitor for wake-up signaling from only the selected TRPs (e.g., rather than always monitoring for wake-up signaling from all TRPs) prior to each on-duration state of the DRX cycle. The WUS configuration 505 may be transmitted in RRC signaling to UE 115-*b* or may be transmitted dynamically to UE 115-*b* in a MAC-CE or DCI message.

In some aspects, it may be appropriate for all TRPs in communication with UE 115-*b* to transmit wake-up signaling to UE 115-*b* prior to or at the beginning of on-duration states of a DRX cycle (e.g., to increase transmit diversity). Thus, in such aspects, the WUS configuration 505 may indicate that all the TRPs may transmit wake-up signaling to UE 115-*b* (e.g., per-TRP WUS), and UE 115-*b* may turn on the panels used to communicate with all the TRPs to monitor for wake-up signaling from all the TRPs (e.g., in the indicated multi-TRP cluster) prior to or at the beginning of each on-duration state of a DRX cycle (i.e., during every pre-wake-up cycle).

In one example, once UE 115-*b* receives at least one WUS prior to or at the beginning of an on-duration state of a DRX cycle, UE 115-*b* may turn on the panels used to communicate with all the TRPs in the on-duration state. That is, in the on-duration state, UE 115-*b* may turn on the panels used to communicate with the TRPs from which the UE 115-*b* receives WUSs prior to or at the beginning of the on-duration state, and UE 115-*b* may turn on panels used to communicate with other TRPs (i.e., the TRPs from which the UE 115-*b* did not receive WUSs prior to or at the beginning of the on-duration state). In this example, the delay associated with using the other TRPs may be reduced (e.g., if the other TRPs are needed), but the power consumption may also be increased unnecessarily (e.g., if the other TRPs are not needed). In another example, in an on-duration state, UE 115-*b* may turn on the panels used to communicate with only those TRPs from which the UE 115-*b* receives WUSs prior to or at the beginning of the on-duration state (i.e., for that on-duration state). In this example, the delay associated with using other TRPs in an on-duration state from which the UE 115-*b* did not receive WUSs prior to or at the beginning of the on-duration sate may be increased (e.g., if the other TRPs are needed), but the power consumption may be decreased (e.g., if the other TRPs are not needed).

In other aspects, it may be appropriate for a subset of all TRPs in communication with UE 115-*b* to transmit wake-up signaling to UE 115-*b* prior to or at the beginning of on-duration states of a DRX cycle (e.g., to minimize power consumption at UE 115-*b*). Thus, in such aspects, the WUS configuration 505 may indicate that a subset of all the TRPs may transmit wake-up signaling to UE 115-*b* (e.g., an anchor TRP), and UE 115-*b* may turn on the panels used to communicate with the subset of TRPs to monitor for wake-up signaling from the subset of TRPs prior to or at the beginning of each on-duration state of a DRX cycle (i.e., during every pre-wake-up cycle).

In one example, once UE 115-*b* receives a WUS prior to or at the beginning of an on-duration state of a DRX cycle from an anchor TRP, UE 115-*b* may turn on the panels used to communicate with all TRPs in the on-duration state. That is, in the on-duration state, UE 115-*b* may turn on the panels used to communicate with all TRPs with which the UE 115-*b* is in communication. In this example, the delay associated with using the other TRPs may be reduced (e.g., if the other TRPs are needed), but the power consumption may also be increased unnecessarily (e.g., if the other TRPs are not needed). In another example, in an on-duration state, UE 115-*b* may turn on the panel used to communicate with the anchor TRP from which the UE 115-*b* receives a WUS prior to or at the beginning of the on-duration state (i.e., for that on-duration state). In this example, UE 115-*b* may then receive a control message in the on-duration state from the anchor TRP that indicates a subset of TRPs that may transmit data or control information in the on-duration state. Thus, after receiving the control message in the on-duration state, UE 115-*b* may turn on the panels used to communicate with the subset of TRPs such that the UE 115-*b* may receive the data or control information from the subset of TRPs in the on-duration state. Since, in this example, UE 115-*b* may not turn on the panels used to communicate with TRPs other than the anchor TRP until UE 115-*b* receives the control message, the delay associated with using the panels to communicate with the other TRPs may increase, but the power consumption at UE 115-*d* may decrease (i.e., as UE 115-*b* may not unnecessarily turn on any panels to monitor for data or control information from TRPs that may not transmit data or control information).

In yet another example, the WUS received from the anchor carrier prior to or at the beginning of an on-duration state may further indicate a subset of TRPs that may transmit data or control information in the on-duration state to UE 115-*b*. Thus, after receiving the WUS, UE 115-*b* may turn on the panels used to communicate with the subset of TRPs such that the UE 115-*b* may receive the data or control information from the subset of TRPs in the on-duration state. Since, in this example, UE 115-*b* may be able to identify the TRPs from which to monitor for data or control information in an on-duration state prior to or at the beginning of the on-duration state, there may be minimal or no delay associated with turning on panels to receive the data or control information from the TRPs in the on-duration state and power consumption may also decrease as UE 115-*b* may not unnecessarily turn on any panels to monitor for data or control information from TRPs that may not transmit data or control information.

Figure 6:
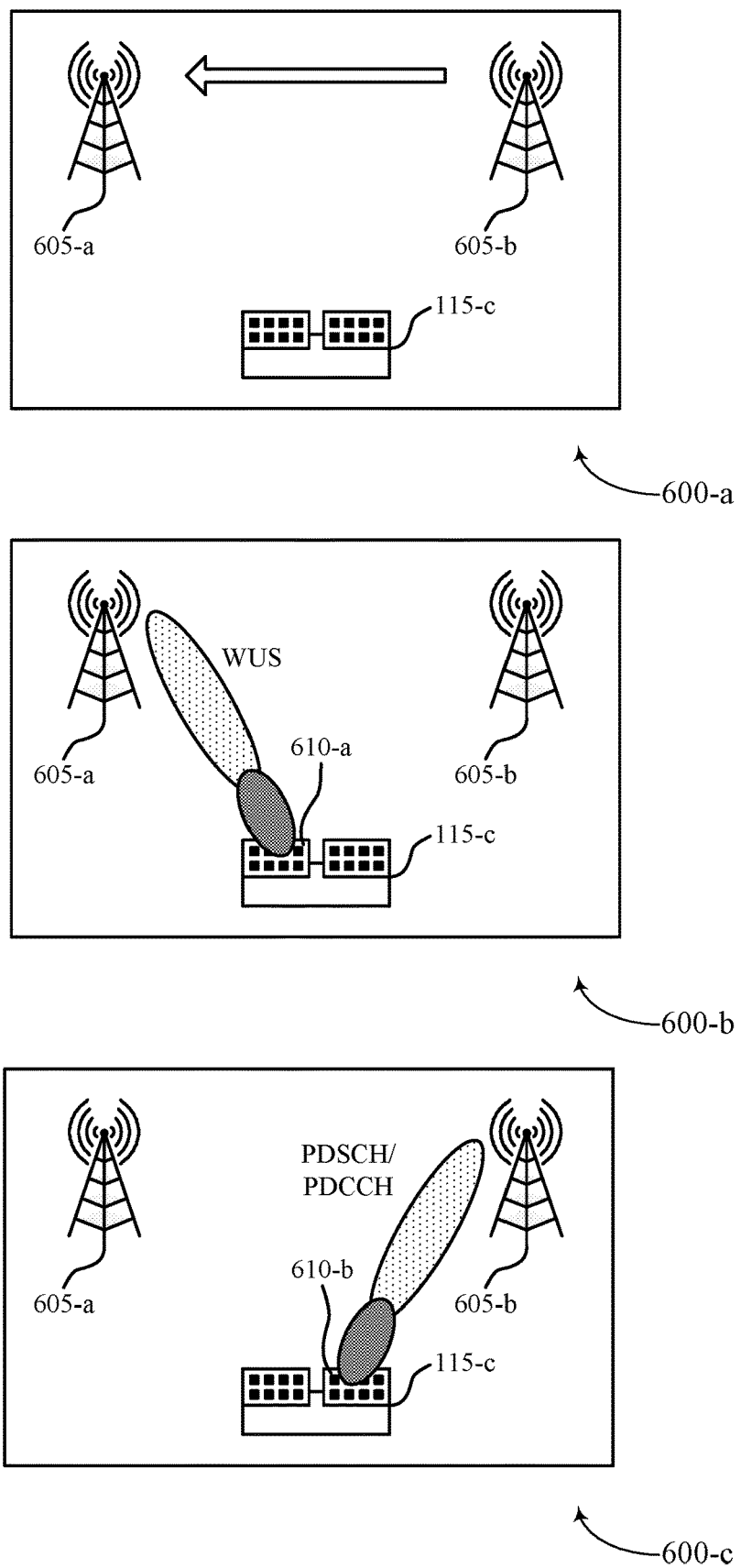
FIG. 6 illustrates an example of a wireless communications system that supports WUS operation for multiple TRPs in accordance with one or more aspects of the present disclosure.

FIG. 6 illustrates an example of operations 600 in a wireless communications system that supports WUS operation for multiple TRPs in accordance with one or more aspects of the present disclosure. In the example of FIG. 6, UE 115-*c* may be configured to monitor for wake-up signaling from an anchor TRP 605-*a* prior to or at the beginning of each on-duration state of a DRX cycle (e.g., based on a WUS configuration for the DRX cycle). As such, in a first operation 600-*a*, when a TRP 605-*b* identifies data (e.g., in a data buffer) to transmit to UE 115-*c* in an on-duration state, TRP 605-*b* may transmit the data to the anchor TRP 605-*a* (e.g., over an ideal or non-ideal backhaul connection between TRP 605-*a* and TRP 605-*b*). That is, TRP 605-*b* may inform the anchor TRP 605-*a* via backhaul of a new data arrival for UE 115-*c*. Then, in a second operation 600-*b*, prior to or at the beginning of an on-duration state, anchor TRP 605-*a* may transmit a WUS to UE 115-*c* indicating the presence of data or control information in the on-duration state (i.e., indicating that a TRP is scheduled to transmit data or control information in the on-duration state).

UE 115-*c* may turn on a panel (e.g., panel 610-*a*) used to communicate with or receive signals from the anchor TRP 605-*a* prior to or at the beginning of the on-duration state (e.g., in a pre-wake stage), and UE 115-*c* may receive the WUS from the anchor TRP 605-*a*. In one example, the WUS may further indicate that TRP 605-*b* is scheduled to transmit the data or control information in the on-duration state, and, in another example, UE 115-*c* may turn on a panel used to communicate with anchor TRP 605-*a* in the on-duration state and may receive a control message indicating that TRP 605-*b* is scheduled to transmit the data or control information in the on-duration state. Thus, in a third operation 600-*c*, UE 115-*c* may turn on a panel (e.g., panel 610-*b*) used to communicate or receive signals from TRP 605-*b* in the on-duration state, and UE 115-*c* may receive the data (PDSCH) or control information (PDCCH) from TRP 605-*b* in the on-duration state. Accordingly, if the WUS or a control message is used to indicate the TRPs that may transmit data or control information in an on-duration state, data may be transmitted either via one TRP (e.g., dynamic TRP selection) or via multiple TRPs (e.g., simultaneous TRP transmission) to UE 115-*c*.

Figure 7:
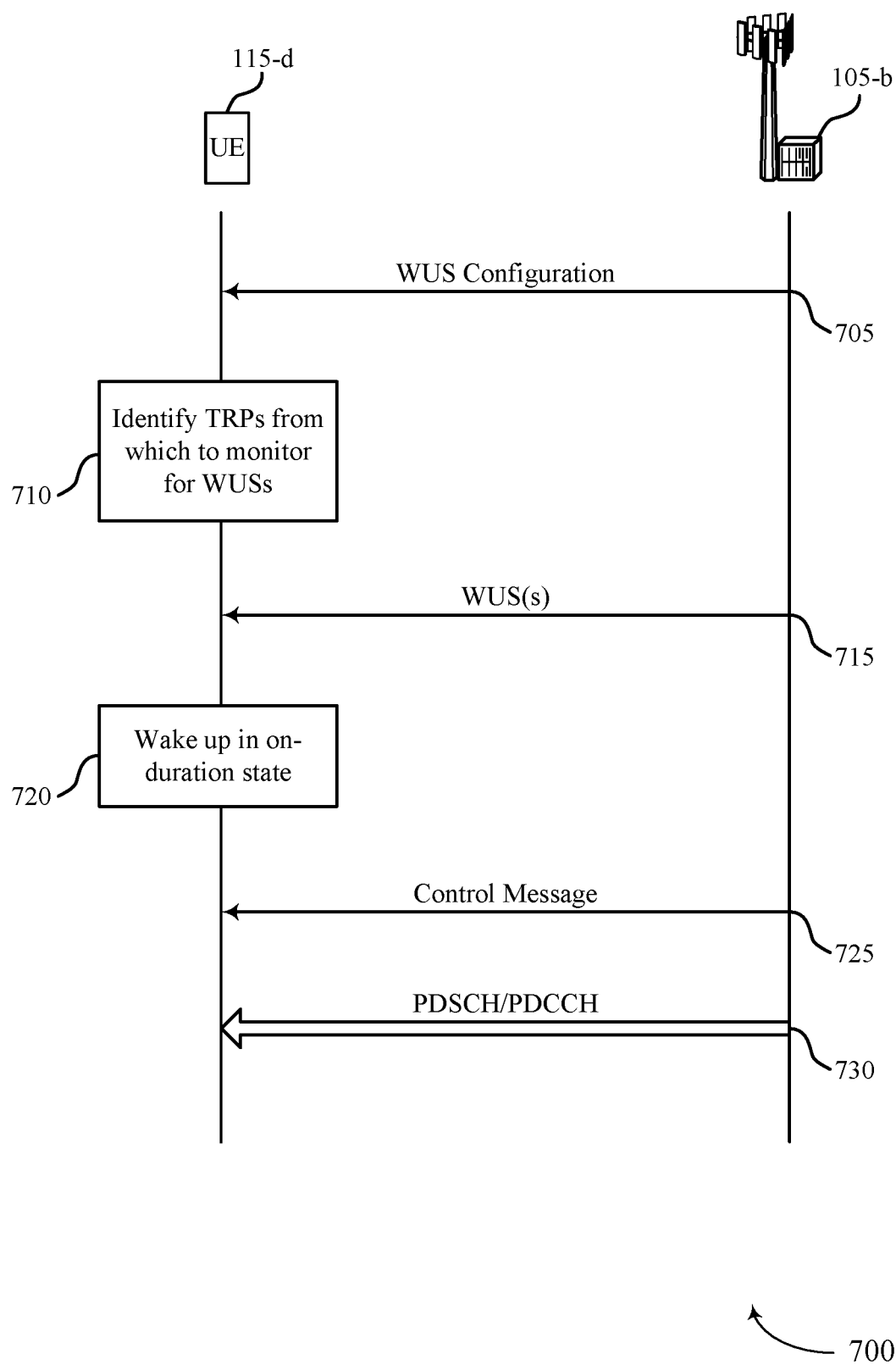
FIG. 7 illustrates an example of a process flow that supports WUS operation for multiple TRPs in accordance with one or more aspects of the present disclosure.

FIG. 7 illustrates an example of a process flow 700 that supports WUS operation for multiple TRPs in accordance with one or more aspects of the present disclosure. Process flow 700 illustrates aspects of techniques performed by a base station 105-*b*, which may be an example of a base station 105 described with reference to FIGS. 1-6. Process flow 700 also illustrates aspects of techniques performed by a UE 115-*d*, which may be an example of a UE 115 described with reference to FIGS. 1-6. Process flow 700 may implement aspects of wireless communications systems 100 and 500. For example, UE 115-*d* in process flow 700 may support efficient techniques for monitoring for wake-up signaling prior to the on-duration of a DRX cycle when UE 115-*d* is configured to communicate on multiple panels with multiple TRPs (e.g., to minimize power consumption at UE 115-*d*).

At 705, base station 105-*b* may select the TRPs through which to transmit wake-up signaling to UE 115-*d* (e.g., based on an indication of suggested TRPs to use for wake-up signaling received from UE 115-*d*), and base station 105-*b* may transmit a WUS configuration to UE 115-*d* indicating at least one TRP of a plurality of TRPs from which the UE 115-*d* is to monitor for wake-up signals (e.g., the TRPs that may transmit wake-up signaling to the UE 115-*d*). The indication of the at least on TRP may be an explicit indication of the index or indices of the at least one TRP of may be an implicit indication of the index or indices of the at least one TRP (e.g., may indicate transmission configuration indication (TCI) state with quasi co-location (QCL) parameters corresponding to the index or indices of the at least one TRP).

Based on the WUS configuration, at 710, UE 115-*d* may identify the TRPs from which to monitor for WUSs, and, prior to or at the beginning of an on-duration state in a DRX cycle, the UE 115-*d* may monitor for wake-up signaling for the DRX cycle from the at least one TRP based at least in part on the WUS configuration. At 715, UE 115-*d* may receive at least one WUS prior to or at the beginning of the on-duration state in the DRX cycle based on the monitoring, the at least one WUS indicating a presence of data or control information in the on-duration state. Thus, at 720, UE 115-*d* may wake up to receive the data or control information in the on-duration state based on receiving the at least one WUS.

In some cases, the WUS configuration received at 705 may indicate a single, anchor TRP from which UE 115-*d* is to monitor for wake-up signals. Thus, UE 115-*d* may monitor for a wake-up signal from the anchor TRP and may receive a wake-up signal from the anchor TRP prior to or at the beginning of an on-duration state of a DRX cycle. In some cases, UE 115-*d* may turn on the panels at UE 115-*d* used to receive signals from the plurality of TRPs to receive the data or control information in the on-duration state (e.g., from all of the plurality of TRPs or from a subset of the plurality of TRPs). In other cases, to limit power consumption at the UE 115-*d*, it may be appropriate for UE 115-*d* to turn on only those panels used to receive signals from the set of TRPs that may be scheduled to transmit data and control information in the on-duration state.

Accordingly, in one example, UE 115-*d* may turn on a panel at the UE 115-*d* used to receive signals from the anchor TRP at the beginning of the on-duration state, and, at 725, UE 115-*d* may receive a control message (e.g., a MAC-CE, DCI message, or RRC message) in the on-duration state from the anchor TRP using the panel after waking up in the on-duration state. The control message may indicate a subset of the plurality of TRPs from which the UE is to monitor for the data or control information in the on-duration state (i.e., the subset of the plurality of TRPs that may transmit data or control information in the on-duration state). Thus, after receiving the control message, UE 115-*d* may turn on panels at the UE 115-*d* used to receive signals from the subset of the plurality of TRPs to receive the data or control information in the on-duration state. In some cases, if the anchor TRP is not in the subset of the TRPs, UE 115-*d* may turn on the panel used to receive signals from the anchor TRP after receiving the control message. The indication of the subset of TRPs may be an explicit indication of the index of each TRP in the subset or may be an implicit indication of the index of each TRP in the subset (e.g., may indicate a TCI state with QCL parameters corresponding to the index of each TRP in the subset).

Thus, based on receiving the control message, the UE 115-*d* may transition from a single-TRP mode to a multi-TRP mode by turning on the panels used to receive signals from the subset of TRPs. In some cases, it may be appropriate for the UE 115-*d* to transition back to a single-TRP mode after some time. Accordingly, in some aspects, the UE 115-*d* may initiate an inactivity timer upon turning on the panels at the UE 115-*d* used to receive signals from the subset of the plurality of TRPs, and UE 115-*d* may turn off the panels used at the UE 115-*d* to receive signals from the subset of the plurality of TRPs when the inactivity timer expires. In such aspects, UE 115-*d* may restart the inactivity timer each time UE 115-*d* receives data or control information from base station 105-*b* (e.g., at the end of a data or control information transmission). In other aspects, base station 105-*b* may indicate when UE 115-*d* is to transition back to a single-TRP mode. In such aspects, UE 115-*d* may receive another control message (e.g., MAC-CE, DCI message, or RRC message) indicating that the UE is to turn off the panels at the UE used to receive signals from the subset of the plurality of TRPs (e.g., or indicating that the subset of the plurality of TRPs are not scheduled for further transmissions in the on-duration state), and UE 115-*d* may turn off the panels at the UE 115-*d* used to receive signals from the subset of the plurality of TRPs based on receiving the other control message. Thus, the single-TRP mode may be the fallback mode, and UE 115-*b* may transfer to a multi-TRP mode by a control message command and may return to the single TRP mode after receiving another control message command or when an inactivity timer expires (e.g., similar to bandwidth part switching or DRX operation).

In another example, as an alternative to or in addition to receiving the control message indicating the subset of TRPs from which to monitor for data or control information in the on-duration state, the WUS received at 715 may further indicate the subset (e.g., or a different subset) of the plurality of TRPs from which the UE 115-*d* is to monitor for the data or control information in the on-duration state. The indication of the subset of TRPs may be an explicit indication of the index of each TRP in the subset or may be an implicit indication of the index of each TRP in the subset (e.g., may indicate a TCI state with QCL parameters corresponding to the index of each TRP in the subset). In such cases, UE 115-*d* may turn on a panel at the UE used to receive signals from the anchor TRP at the beginning of or in the on-duration state, and UE 115-*d* may turn on panels at the UE 115-*d* used to receive signals from the subset of the plurality of TRPs at the beginning of or in the on-duration state to receive the data or control information in the on-duration state. In some aspects, UE 115-*d* may only turn on the panel used to receive signals from the anchor TRP if the anchor TRP is included in the subset of the plurality of TRPs from which UE 115-*d* is to monitor for data or control information in the on-duration state. In any case, once UE 115-*d* receives the WUS or WUSs at 715 prior to an on-duration state, UE 115-*d* may wake-up (i.e., turn on the appropriate panels) to receive the data (PDSCH) or control information (PDCCH) from base station 105-*b* at 730.

Figure 8:
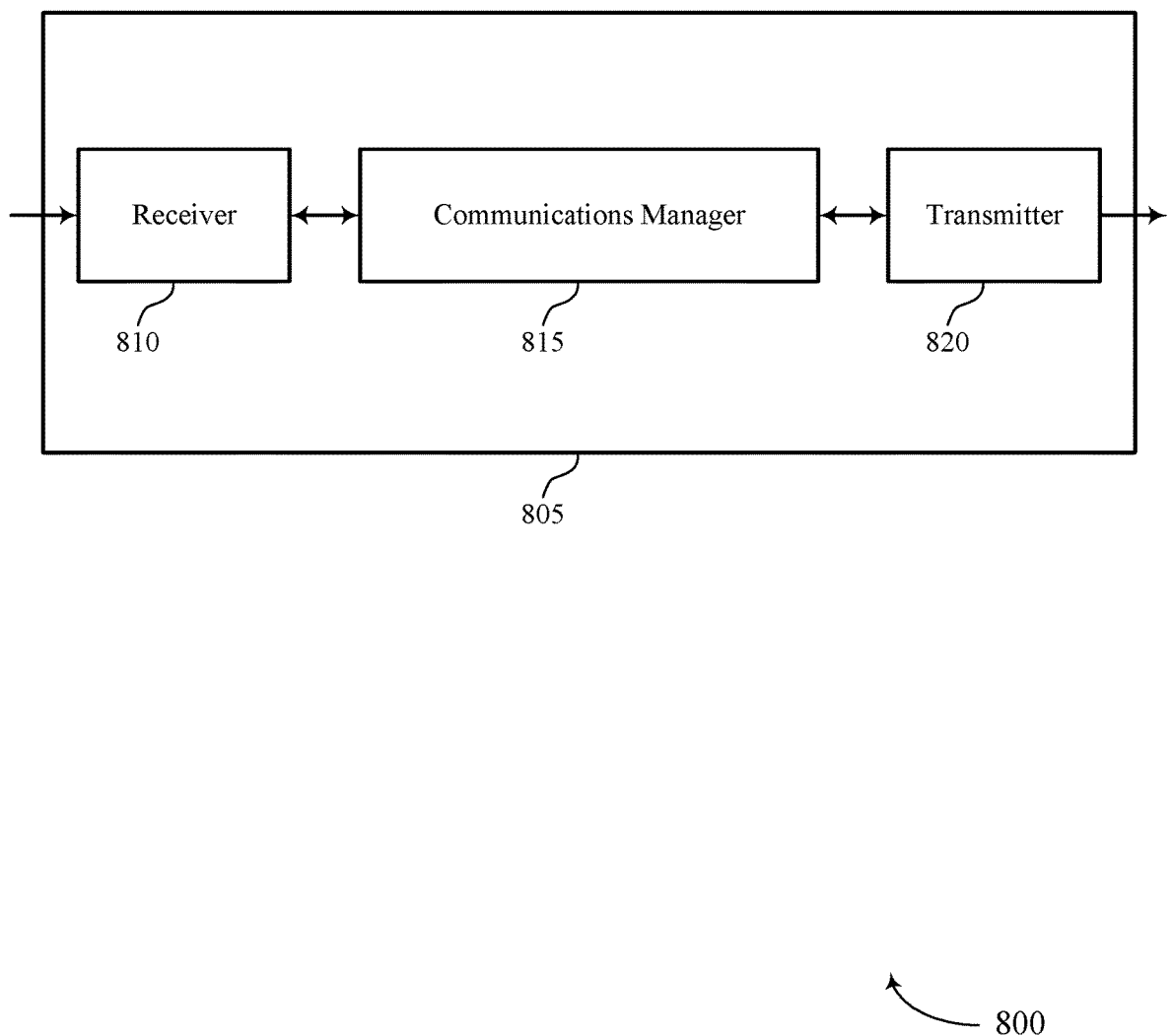
FIGS. 8 and 9 show block diagrams of devices that support WUS operation for multiple TRPs in accordance with one or more aspects of the present disclosure.

FIG. 8 shows a block diagram 800 of a device 805 that supports WUS operation for multiple TRPs in accordance with one or more aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to WUS operation for multiple TRPs, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a wake-up signal configuration from a base station, the wake-up signal configuration indicating at least one transmission/reception point of a set of transmission/reception points from which the UE is to monitor for wake-up signals, monitor for wake-up signaling from the at least one transmission/reception point based on the wake-up signal configuration, the wake-up signaling being for a discontinuous reception cycle, receive at least one wake-up signal prior to or at the beginning of an on-duration state in the discontinuous reception cycle based on the monitoring, the at least one wake-up signal indicating a presence of data or control information in the on-duration state, and wake up for the UE to receive the data or control information in the on-duration state based on receiving the at least one wake-up signal. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
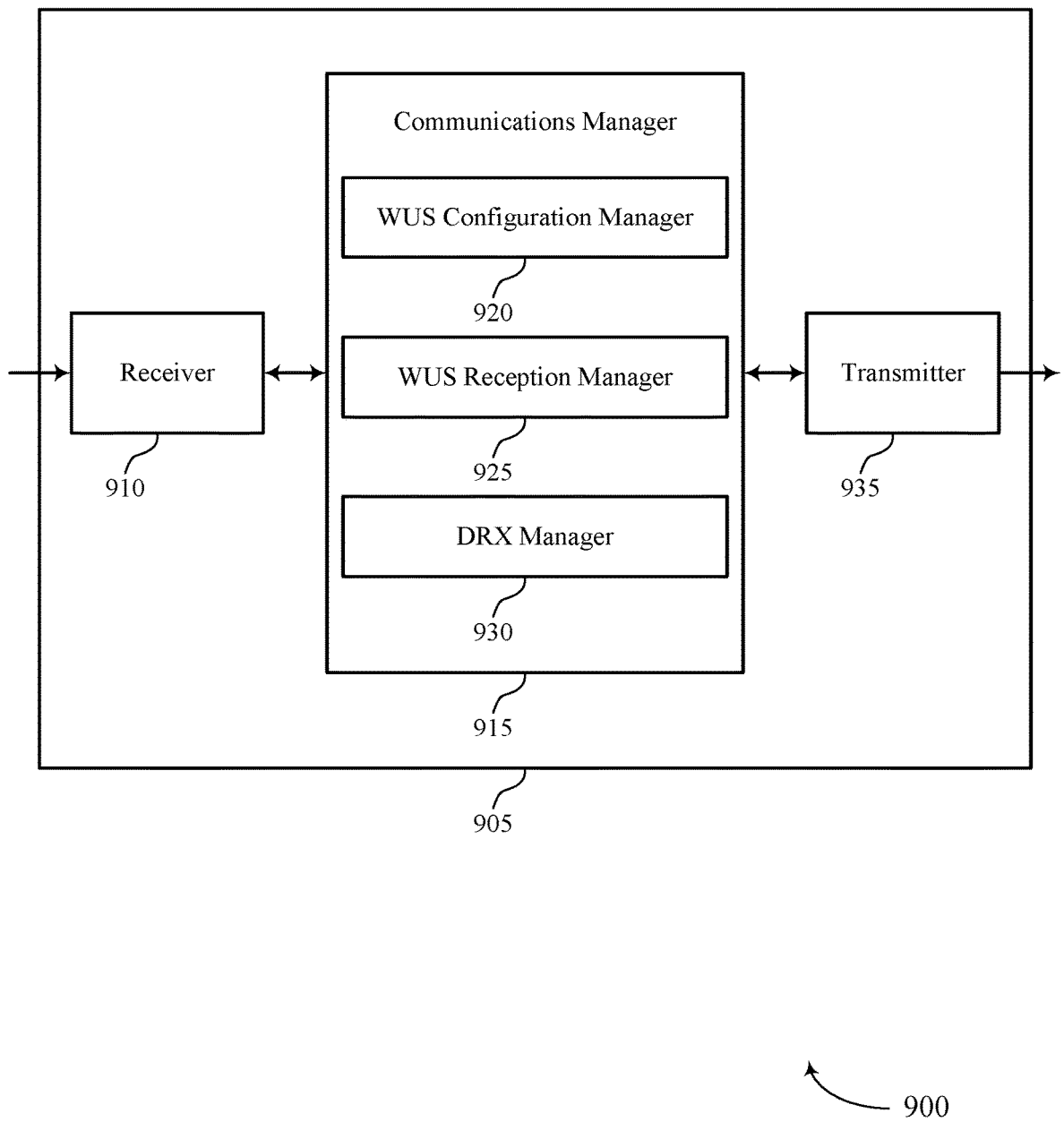

FIG. 9 shows a block diagram 900 of a device 905 that supports WUS operation for multiple TRPs in accordance with one or more aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to WUS operation for multiple TRPs, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a WUS configuration manager 920, a WUS reception manager 925, and a DRX manager 930. The communications manager 915 may be an example of aspects of the communications manager 1110 described herein.

The WUS configuration manager 920 may receive a wake-up signal configuration from a base station, the wake-up signal configuration indicating at least one transmission/reception point of a set of transmission/reception points from which the UE is to monitor for wake-up signals. The WUS reception manager 925 may monitor for wake-up signaling from the at least one transmission/reception point based on the wake-up signal configuration, the wake-up signaling being for a discontinuous reception cycle and receive at least one wake-up signal prior to or at the beginning of an on-duration state in the discontinuous reception cycle based on the monitoring, the at least one wake-up signal indicating a presence of data or control information in the on-duration state. The DRX manager 930 may wake up for the UE to receive the data or control information in the on-duration state based on receiving the at least one wake-up signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
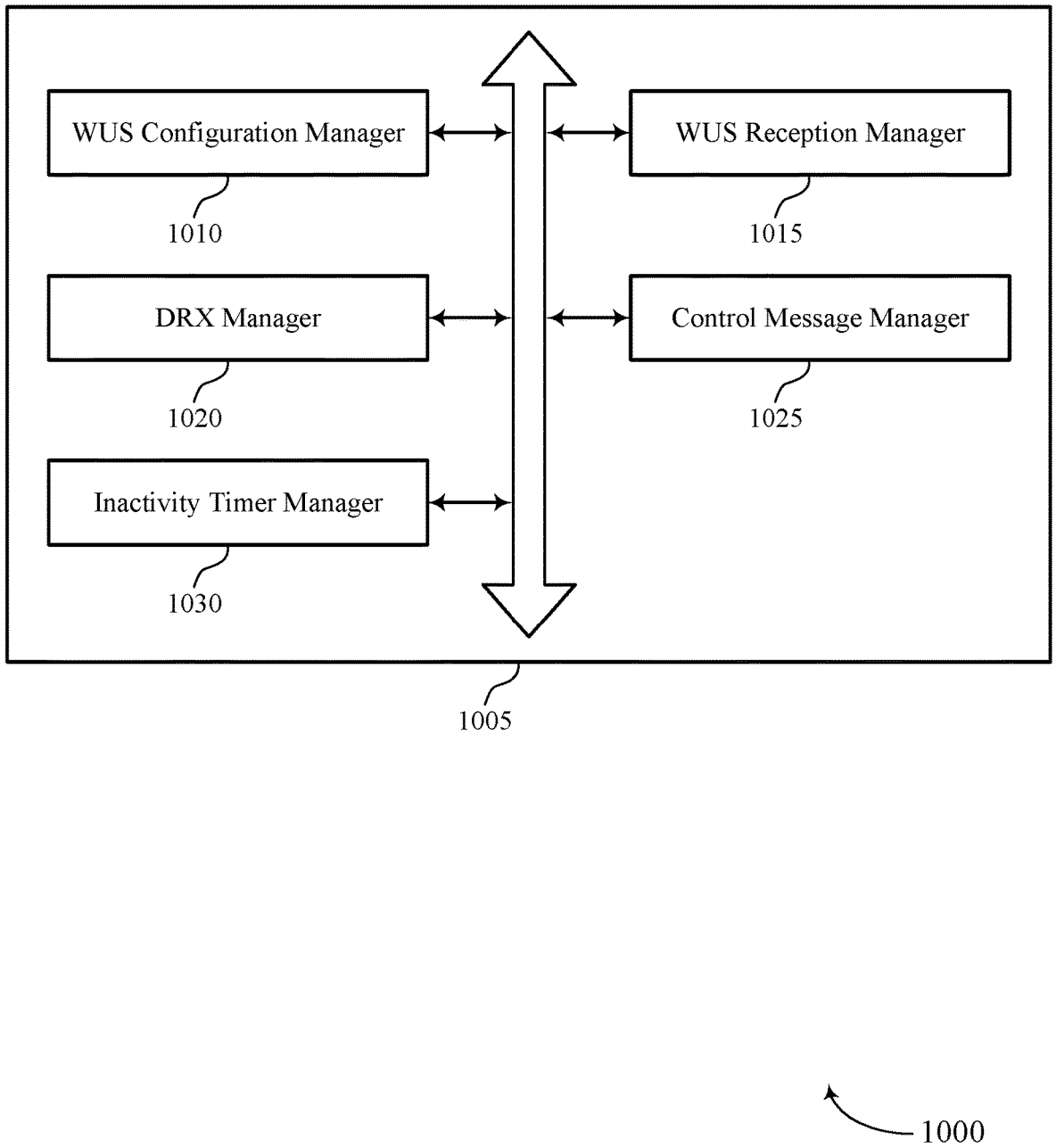
FIG. 10 shows a block diagram of a communications manager that supports WUS operation for multiple TRPs in accordance with one or more aspects of the present disclosure.

FIG. 10 shows a block diagram 1000 of a communications manager 1005 that supports WUS operation for multiple TRPs in accordance with one or more aspects of the present disclosure. The communications manager 1005 may be an example of aspects of a communications manager 815, a communications manager 915, or a communications manager 1110 described herein. The communications manager 1005 may include a WUS configuration manager 1010, a WUS reception manager 1015, a DRX manager 1020, a control message manager 1025, and an inactivity timer manager 1030. Each of these modules may communicate, directly or indirectly, with one another (e.g., via one or more buses).

The WUS configuration manager 1010 may receive a wake-up signal configuration from a base station, the wake-up signal configuration indicating at least one transmission/reception point of a set of transmission/reception points from which the UE is to monitor for wake-up signals. In some cases, the indication of the at least one transmission/reception point of the set of transmission/reception points includes an explicit indication of indices of the at least one transmission/reception point or an indication of transmission configuration indication states corresponding to the indices of the at least one transmission/reception point.

The WUS reception manager 1015 may monitor for wake-up signaling from the at least one transmission/reception point based on the wake-up signal configuration, the wake-up signaling being for a discontinuous reception cycle. In some examples, the WUS reception manager 1015 may receive at least one wake-up signal prior to or at the beginning of an on-duration state in the discontinuous reception cycle based on the monitoring, the at least one wake-up signal indicating a presence of data or control information in the on-duration state. In some examples, the WUS reception manager 1015 may monitor for a wake-up signal from the anchor transmission/reception point. In some examples, the WUS reception manager 1015 may receive a wake-up signal from the anchor transmission/reception point, the wake-up signal indicating the presence of data or control information in the on-duration state. In some examples, the WUS reception manager 1015 may monitor for wake-up signals from each of the set of transmission/reception points.

In some examples, the WUS reception manager 1015 may receive wake-up signals from a subset of the set of transmission/reception points, the wake-up signals indicating the presence of data or control information in the on-duration state and indicating the subset of the set of transmission/reception points from which the UE is to monitor for the data or control information in the on-duration state. In some cases, the wake-up signal further indicates a subset of the set of transmission/reception points from which the UE is to monitor for the data or control information in the on-duration state. In some cases, the indication of the subset of the set of transmission/reception points includes an explicit indication of indices of the subset of the set of transmission/reception points or an indication of transmission configuration indication states corresponding to the indices of the subset of the set of transmission/reception points.

The DRX manager 1020 may wake up for the UE to receive the data or control information in the on-duration state based on receiving the at least one wake-up signal. In some examples, the DRX manager 1020 may turn on panels at the UE used to receive signals from the set of transmission/reception points to receive the data or control information in the on-duration state. In some examples, the DRX manager 1020 may turn on a panel at the UE used to receive signals from the anchor transmission/reception point. In some examples, the DRX manager 1020 may turn on panels at the UE used to receive signals from the subset of the set of transmission/reception points to receive the data or control information in the on-duration state. In some examples, the DRX manager 1020 may turn off the panels used at the UE to receive signals from the subset of the set of transmission/reception points when the inactivity timer expires.

In some examples, the DRX manager 1020 may turn off the panels at the UE used to receive signals from the subset of the set of transmission/reception points based on receiving the other control message. In some examples, the DRX manager 1020 may turn on a panel at the UE used to receive signals from the anchor transmission/reception point in the on-duration state. In some examples, the DRX manager 1020 may turn on panels at the UE used to receive signals from the subset of the set of transmission/reception points to receive the data or control information in the on-duration state from the subset of the set of transmission/reception points. In some examples, the DRX manager 1020 may turn on panels at the UE used to receive signals from the set of transmission/reception points to receive the data or control information in the on-duration state from the subset of the set of transmission/reception points.

The control message manager 1025 may receive a control message in the on-duration state from the anchor transmission/reception point using the panel after waking up in the on-duration state, the control message indicating a subset of the set of transmission/reception points from which the UE is to monitor for the data or control information in the on-duration state. In some examples, the control message manager 1025 may receive another control message indicating that the UE is to turn off the panels at the UE used to receive signals from the subset of the set of transmission/reception points. In some cases, the control message includes a MAC-CE, a DCI message, or an RRC message. In some cases, the indication of the subset of the set of transmission/reception points includes an explicit indication of indices of the subset of the set of transmission/reception points or an indication of transmission configuration indication states corresponding to the indices of the subset of the set of transmission/reception points. The inactivity timer manager 1030 may initiate an inactivity timer upon turning on the panels at the UE used to receive signals from the subset of the set of transmission/reception points.

Figure 11:
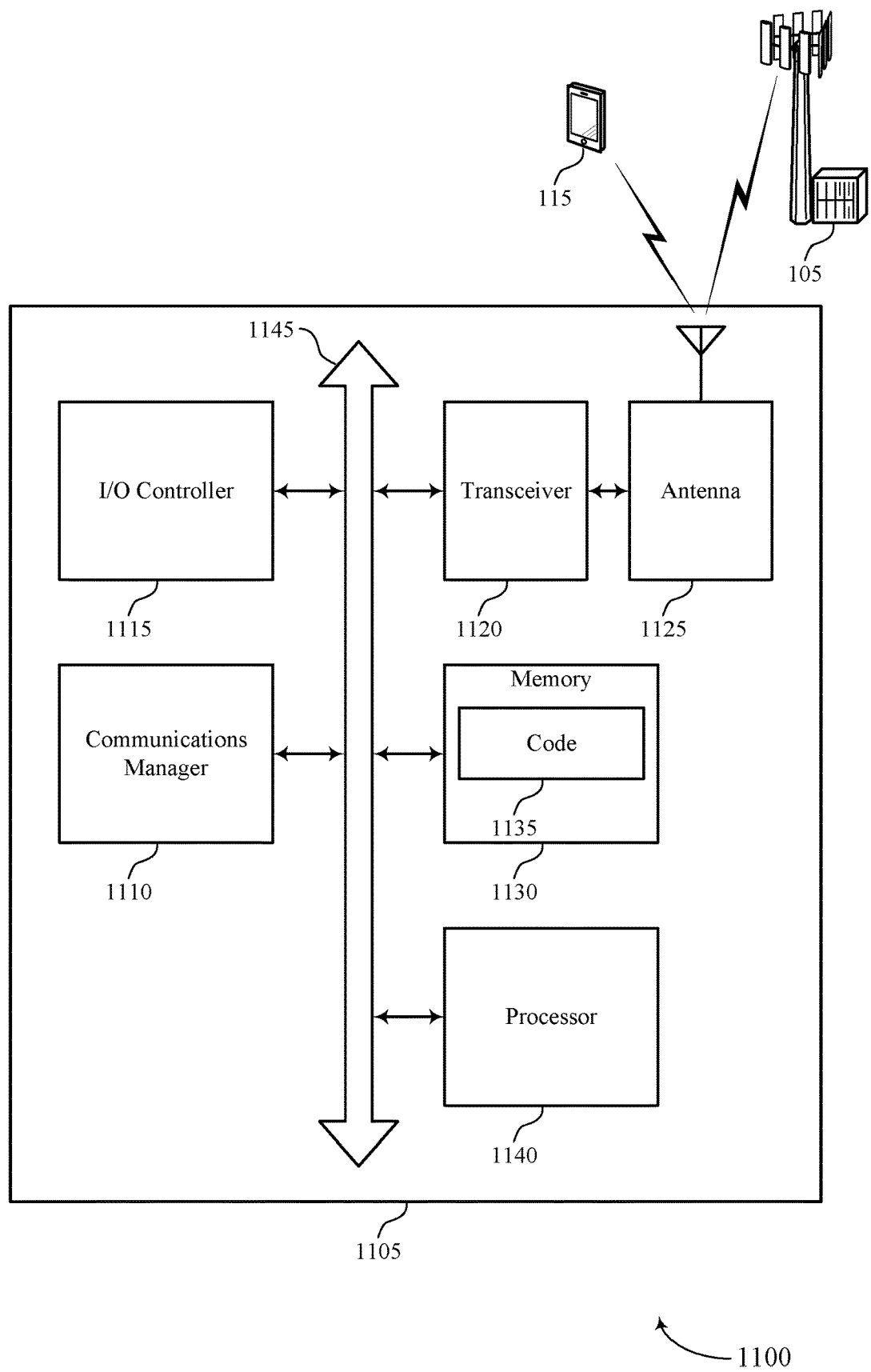
FIG. 11 shows a diagram of a system including a device that supports WUS operation for multiple TRPs in accordance with one or more aspects of the present disclosure.

FIG. 11 shows a diagram of a system 1100 including a device 1105 that supports WUS operation for multiple TRPs in accordance with one or more aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a wake-up signal configuration from a base station, the wake-up signal configuration indicating at least one transmission/reception point of a set of transmission/reception points from which the UE is to monitor for wake-up signals, monitor for wake-up signaling from the at least one transmission/reception point based on the wake-up signal configuration, the wake-up signaling being for a discontinuous reception cycle, receive at least one wake-up signal prior to or at the beginning of an on-duration state in the discontinuous reception cycle based on the monitoring, the at least one wake-up signal indicating a presence of data or control information in the on-duration state, and wake up for the UE to receive the data or control information in the on-duration state based on receiving the at least one wake-up signal.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting WUS operation for multiple TRPs).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
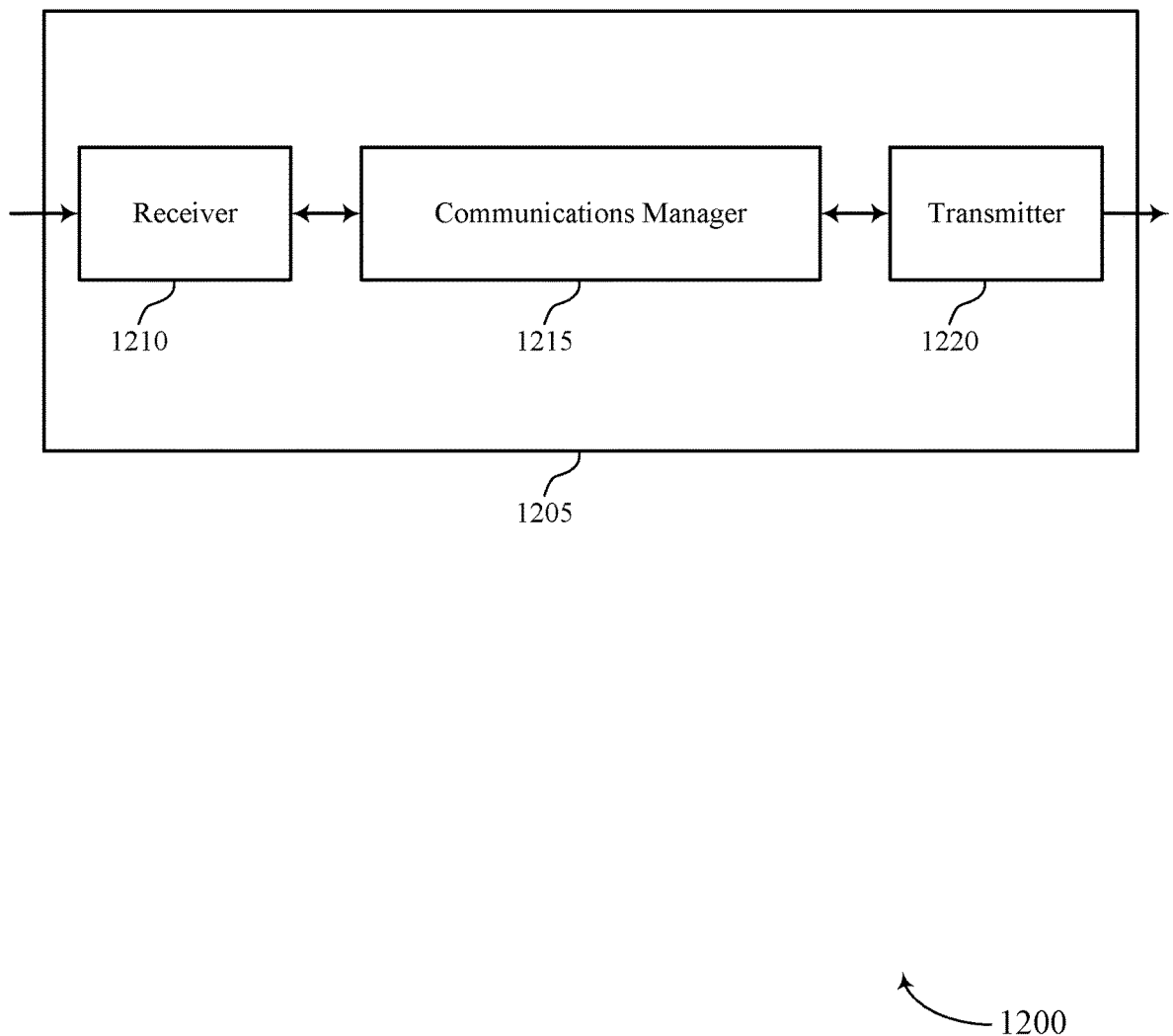
FIGS. 12 and 13 show block diagrams of devices that support WUS operation for multiple TRPs in accordance with one or more aspects of the present disclosure.

FIG. 12 shows a block diagram 1200 of a device 1205 that supports WUS operation for multiple TRPs in accordance with one or more aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to WUS operation for multiple TRPs, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a wake-up signal configuration to a UE, the wake-up signal configuration indicating at least one transmission/reception point of a set of transmission/reception points from which the UE is to monitor for wake-up signals, identify data or control information to transmit to the UE via a subset of the set of transmission/reception points, and transmit at least one wake-up signal to the UE prior to or at the beginning of an on-duration state in a discontinuous reception cycle via one or more of the at least one transmission/reception point, the at least one wake-up signal indicating a presence of the data or control information in the on-duration state of the discontinuous reception cycle. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
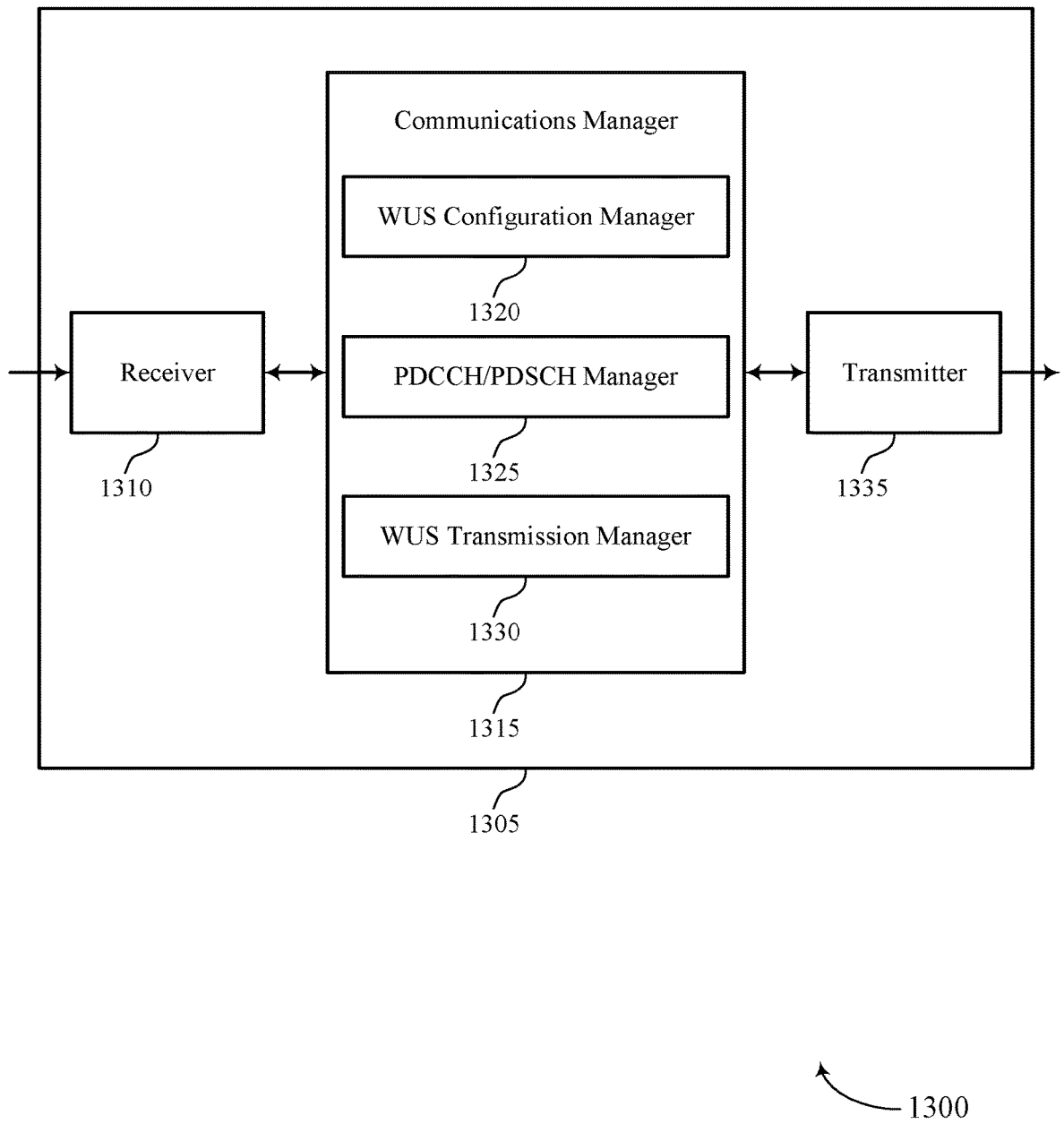

FIG. 13 shows a block diagram 1300 of a device 1305 that supports WUS operation for multiple TRPs in accordance with one or more aspects of the present disclosure. The device 1305 may be an example of aspects of a device 1205, or a base station 105 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to WUS operation for multiple TRPs, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a WUS configuration manager 1320, a PDCCH/PDSCH manager 1325, and a WUS transmission manager 1330. The communications manager 1315 may be an example of aspects of the communications manager 1510 described herein.

The WUS configuration manager 1320 may transmit a wake-up signal configuration to a UE, the wake-up signal configuration indicating at least one transmission/reception point of a set of transmission/reception points from which the UE is to monitor for wake-up signals. The PDCCH/PDSCH manager 1325 may identify data or control information to transmit to the UE via a subset of the set of transmission/reception points. The WUS transmission manager 1330 may transmit at least one wake-up signal to the UE prior to or at the beginning of an on-duration state in a discontinuous reception cycle via one or more of the at least one transmission/reception point, the at least one wake-up signal indicating a presence of the data or control information in the on-duration state of the discontinuous reception cycle.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
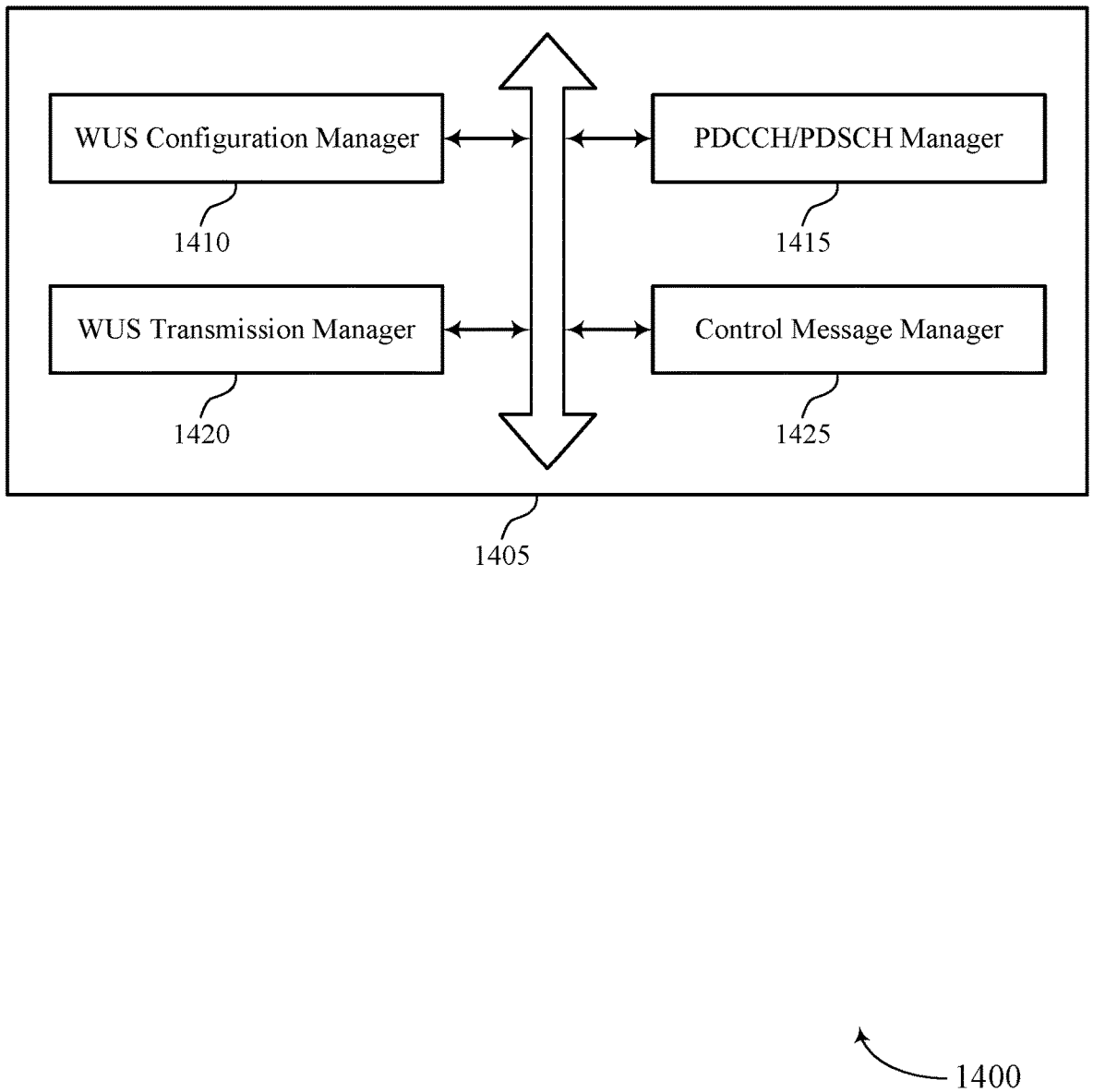
FIG. 14 shows a block diagram of a communications manager that supports WUS operation for multiple TRPs in accordance with one or more aspects of the present disclosure.

FIG. 14 shows a block diagram 1400 of a communications manager 1405 that supports WUS operation for multiple TRPs in accordance with one or more aspects of the present disclosure. The communications manager 1405 may be an example of aspects of a communications manager 1215, a communications manager 1315, or a communications manager 1510 described herein. The communications manager 1405 may include a WUS configuration manager 1410, a PDCCH/PDSCH manager 1415, a WUS transmission manager 1420, and a control message manager 1425. Each of these modules may communicate, directly or indirectly, with one another (e.g., via one or more buses).

The WUS configuration manager 1410 may transmit a wake-up signal configuration to a UE, the wake-up signal configuration indicating at least one transmission/reception point of a set of transmission/reception points from which the UE is to monitor for wake-up signals. In some cases, the indication of the at least one transmission/reception point of the set of transmission/reception points includes an explicit indication of indices of the at least one transmission/reception point or an indication of transmission configuration indication states corresponding to the indices of the at least one transmission/reception point. The PDCCH/PDSCH manager 1415 may identify data or control information to transmit to the UE via a subset of the set of transmission/reception points. In some examples, the PDCCH/PDSCH manager 1415 may transmit the data or control information in the on-duration state via the subset of the set of transmission/reception points.

The WUS transmission manager 1420 may transmit at least one wake-up signal to the UE prior to or at the beginning of an on-duration state in a discontinuous reception cycle via one or more of the at least one transmission/reception point, the at least one wake-up signal indicating a presence of the data or control information in the on-duration state of the discontinuous reception cycle. In some examples, the WUS transmission manager 1420 may transmit a wake-up signal to the UE via the anchor transmission/reception point, the wake-up signal indicating the presence of data or control information in the on-duration state. In some cases, the wake-up signal further indicates the subset of the set of transmission/reception points from which the UE is to monitor for the data or control information in the on-duration state. In some cases, the indication of the subset of the set of transmission/reception points includes an explicit indication of indices of the subset of the set of transmission/reception points or an indication of transmission configuration indication states corresponding to the indices of the subset of the set of transmission/reception points.

The control message manager 1425 may transmit a control message in the on-duration state via the anchor transmission/reception point, the control message indicating the subset of the set of transmission/reception points from which the UE is to monitor for the data or control information in the on-duration state. In some examples, the control message manager 1425 may transmit another control message indicating the subset of the set of transmission/reception points from which the UE is to stop monitoring for further data or control information in the on-duration state. In some cases, the control message includes a MAC-CE, a DCI message, or an RRC message. In some cases, the indication of the subset of the set of transmission/reception points includes an explicit indication of indices of the subset of the set of transmission/reception points or an indication of transmission configuration indication states corresponding to the indices of the subset of the set of transmission/reception points.

Figure 15:
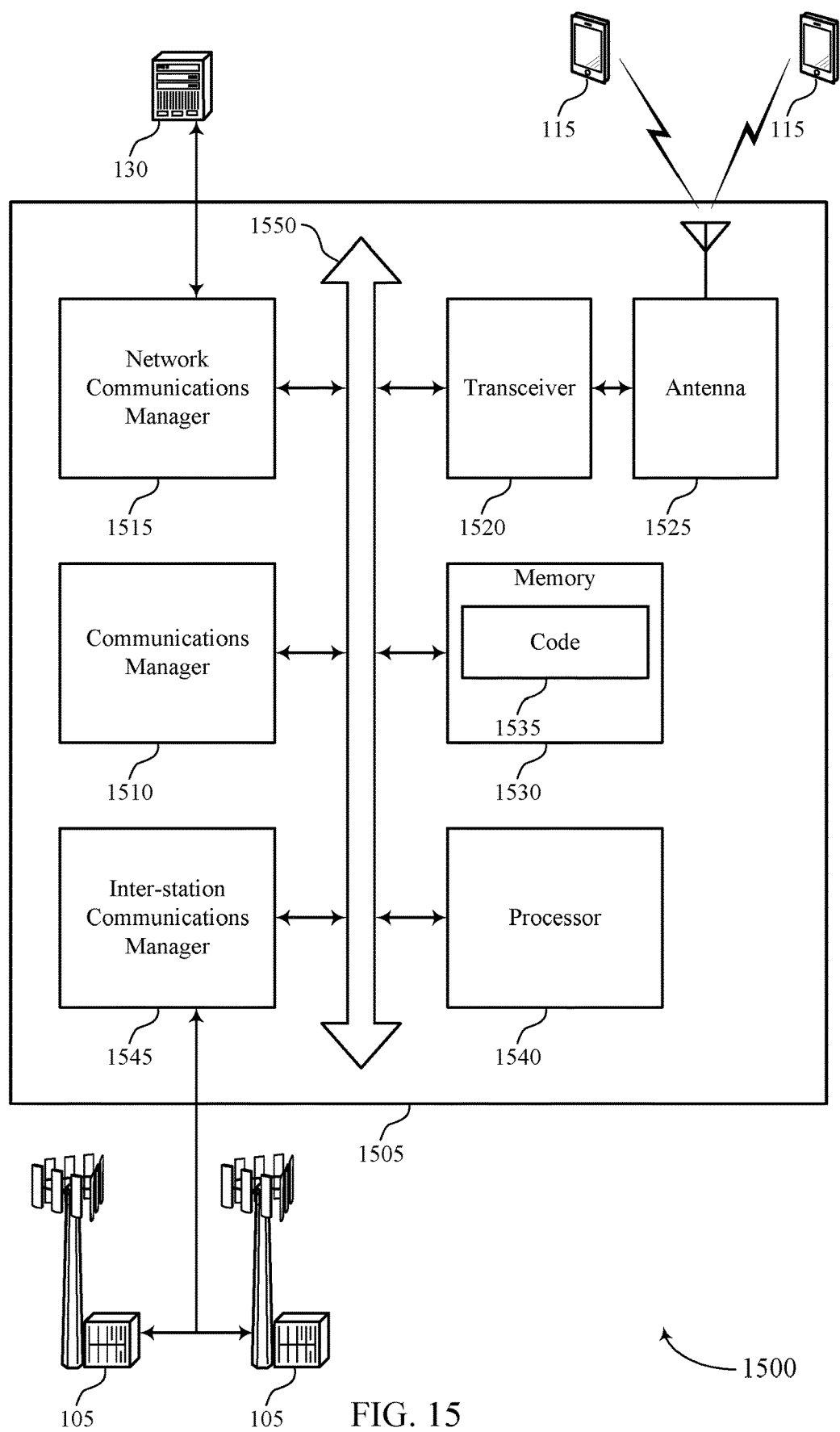
FIG. 15 shows a diagram of a system including a device that supports WUS operation for multiple TRPs in accordance with one or more aspects of the present disclosure.

FIG. 15 shows a diagram of a system 1500 including a device 1505 that supports WUS operation for multiple TRPs in accordance with one or more aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a wake-up signal configuration to a UE, the wake-up signal configuration indicating at least one transmission/reception point of a set of transmission/reception points from which the UE is to monitor for wake-up signals, identify data or control information to transmit to the UE via a subset of the set of transmission/reception points, and transmit at least one wake-up signal to the UE prior to or at the beginning of an on-duration state in a discontinuous reception cycle via one or more of the at least one transmission/reception point, the at least one wake-up signal indicating a presence of the data or control information in the on-duration state of the discontinuous reception cycle.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting WUS operation for multiple TRPs).

The inter-station communications manager 1545 may manage communications with other base station 105 and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
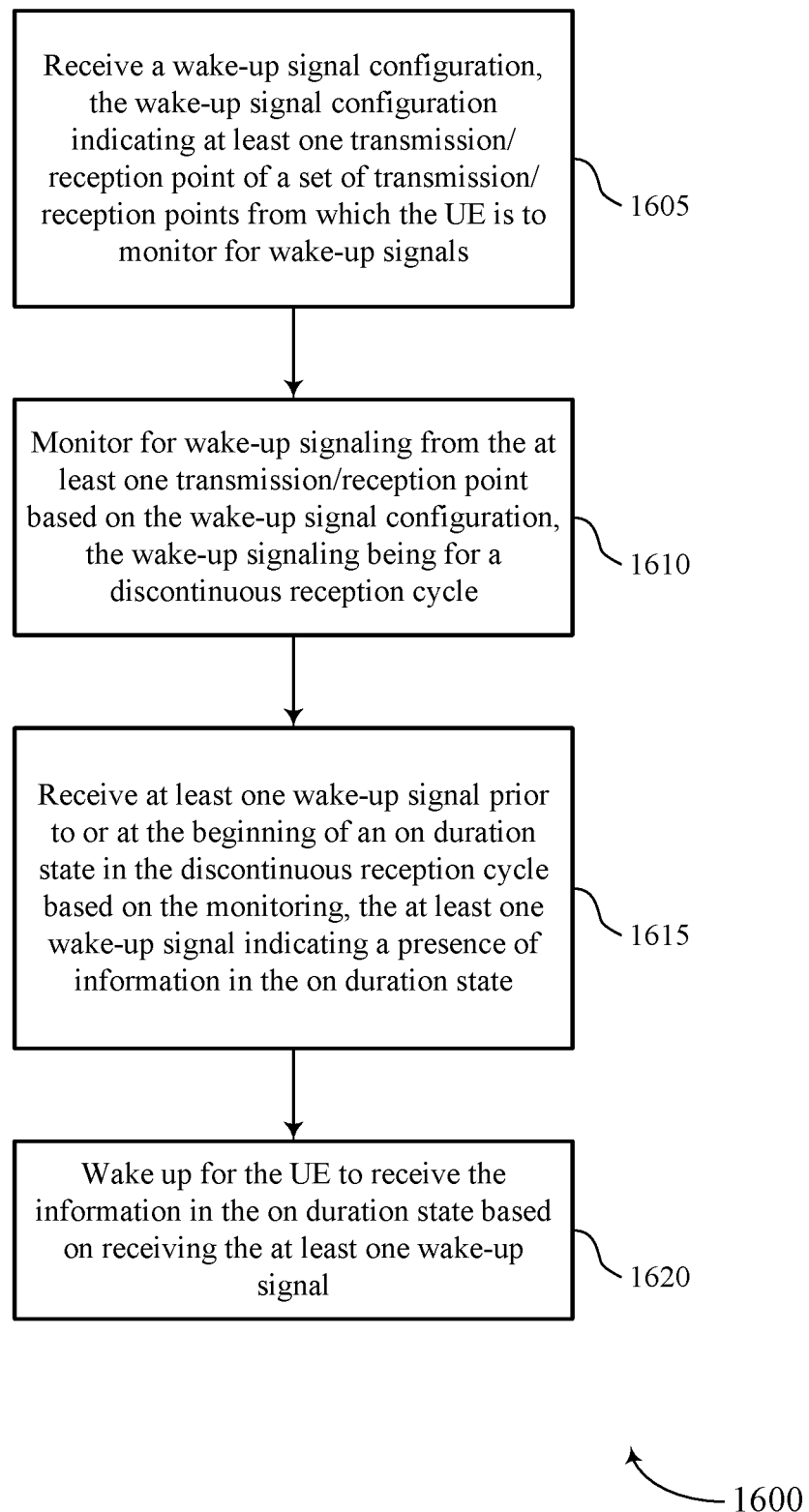
FIGS. 16 and 17 show flowcharts illustrating methods that support WUS operation for multiple TRPs in accordance with one or more aspects of the present disclosure.

FIG. 16 shows a flowchart illustrating a method 1600 that supports WUS operation for multiple TRPs in accordance with one or more aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally, or alternatively, a UE may perform aspects of the functions described below using special-purpose hardware.

At 1605, the UE may receive a wake-up signal configuration, the wake-up signal configuration indicating at least one transmission/reception point of a set of transmission/reception points from which the UE is to monitor for wake-up signals. The operations of 1605 may be performed according to the methods described herein. In some examples, aspects of the operations of 1605 may be performed by a WUS configuration manager as described with reference to FIGS. 8 through 11.

At 1610, the UE may monitor for wake-up signaling from the at least one transmission/reception point based on the wake-up signal configuration, the wake-up signaling being for a discontinuous reception cycle. The operations of 1610 may be performed according to the methods described herein. In some examples, aspects of the operations of 1610 may be performed by a WUS reception manager as described with reference to FIGS. 8 through 11.

At 1615, the UE may receive at least one wake-up signal prior to or at the beginning of an on-duration state in the discontinuous reception cycle based on the monitoring, the at least one wake-up signal indicating a presence of information in the on-duration state. The operations of 1615 may be performed according to the methods described herein. In some examples, aspects of the operations of 1615 may be performed by a WUS reception manager as described with reference to FIGS. 8 through 11.

At 1620, the UE may wake up for the UE to receive the information in the on-duration state based on receiving the at least one wake-up signal. The operations of 1620 may be performed according to the methods described herein. In some examples, aspects of the operations of 1620 may be performed by a DRX manager as described with reference to FIGS. 8 through 11.

Figure 17:
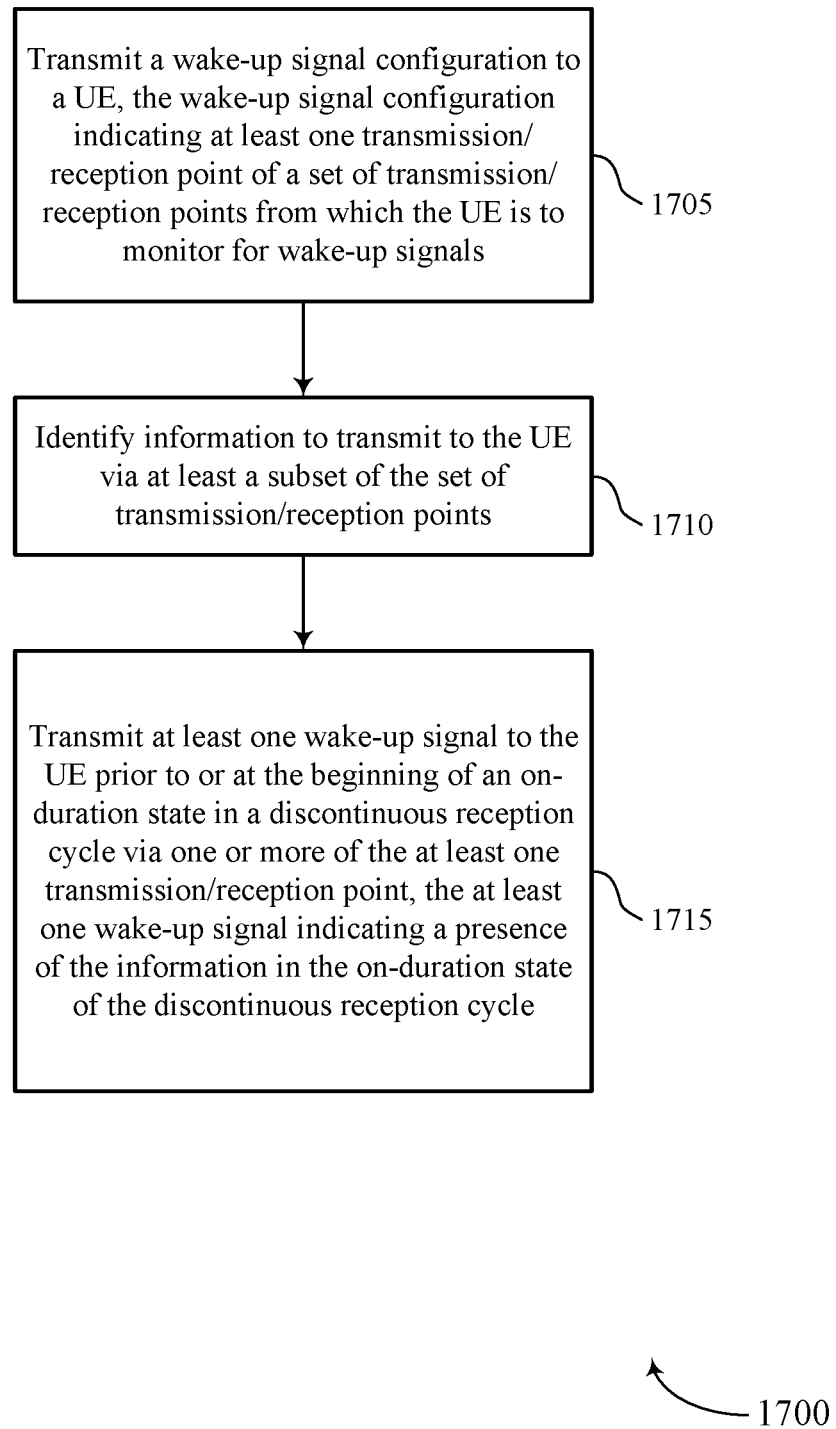

FIG. 17 shows a flowchart illustrating a method 1700 that supports WUS operation for multiple TRPs in accordance with one or more aspects of the present disclosure. The operations of method 1700 may be implemented by a network entity (e.g., a base station 105 or its components) as described herein. For example, the operations of method 1700 may be performed by a communications manager as described with reference to FIGS. 12 through 15. In some examples, a network entity or a base station may execute a set of instructions to control the functional elements of the network entity or the base station to perform the functions described below. Additionally, or alternatively, a network entity or base station may perform aspects of the functions described below using special-purpose hardware.

At 1705, the network entity or base station may transmit a wake-up signal configuration to a UE, the wake-up signal configuration indicating at least one transmission/reception point of a set of transmission/reception points from which the UE is to monitor for wake-up signals. The operations of 1705 may be performed according to the methods described herein. In some examples, aspects of the operations of 1705 may be performed by a WUS configuration manager as described with reference to FIGS. 12 through 15.

At 1710, the network entity or base station may identify information to transmit to the UE via at least a subset of the set of transmission/reception points. The operations of 1710 may be performed according to the methods described herein. In some examples, aspects of the operations of 1710 may be performed by a PDCCH/PDSCH manager as described with reference to FIGS. 12 through 15.

At 1715, the network entity or base station may transmit at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle. The operations of 1715 may be performed according to the methods described herein. In some examples, aspects of the operations of 1715 may be performed by a WUS transmission manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Example 1

A method for wireless communications at a UE, comprising: receiving a wake-up signal configuration, the wake-up signal configuration indicating at least one transmission/reception point of a plurality of transmission/reception points from which the UE is to monitor for wake-up signals; monitoring for wake-up signaling from the at least one transmission/reception point based at least in part on the wake-up signal configuration, the wake-up signaling being for a discontinuous reception cycle; receiving at least one wake-up signal prior to or at the beginning of an on-duration state in the discontinuous reception cycle based at least in part on the monitoring, the at least one wake-up signal indicating a presence of information in the on-duration state; and waking up to receive information in the on-duration state based at least in part on receiving the at least one wake-up signal.

Example 2

The method of example 1, wherein the at least one transmission/reception point comprises a single, anchor transmission/reception point, and wherein monitoring further comprises monitoring for a wake-up signal from the anchor transmission/reception point.

Example 3

The method of example 1 or 2, wherein receiving the at least one wake-up signal comprises receiving a wake-up signal from the anchor transmission/reception point, the wake-up signal indicating the presence of information in the on-duration state.

Example 4

The method of any of examples 1 to 3, wherein receiving the at least one wake-up signal comprises receiving a wake-up signal from the anchor transmission/reception point, the wake-up signal indicating the presence of information in the on-duration state.

Example 5

The method of any of examples 1 to 4, wherein waking up for the UE to receive the information in the on-duration state comprises: turning on a panel at the UE used to receive signals from the anchor transmission/reception point; receiving a control message in the on-duration state from the anchor transmission/reception point using the panel after waking up in the on-duration state, the control message indicating a subset of the plurality of transmission/reception points from which the UE is to monitor for the information in the on-duration state; and turning on panels at the UE used to receive signals from the subset of the plurality of transmission/reception points to receive the information in the on-duration state.

Example 6

The method of any of examples 1 to 5, further comprising: initiating an inactivity timer upon turning on the panels at the UE used to receive signals from the subset of the plurality of transmission/reception points; and turning off the panels used at the UE to receive signals from the subset of the plurality of transmission/reception points when the inactivity timer expires.

Example 7

The method of any of examples 1 to 6, further comprising: receiving another control message indicating that the UE is to turn off the panels at the UE used to receive signals from the subset of the plurality of transmission/reception points; and turning off the panels at the UE used to receive signals from the subset of the plurality of transmission/reception points based at least in part on receiving the other control message.

Example 8

The method of any of examples 1 to 7, wherein the control message comprises a medium access control (MAC) control element (MAC-CE), a downlink control information (DCI) message, or a radio resource control (RRC) message.

Example 9

The method of any of examples 1 to 8, wherein the indication of the subset of the plurality of transmission/reception points comprises an explicit indication of indices of the subset of the plurality of transmission/reception points or an indication of transmission configuration indication states corresponding to the indices of the subset of the plurality of transmission/reception points.

Example 10

The method of any of examples 1 to 9, wherein the wake-up signal further indicates a subset of the plurality of transmission/reception points from which the UE is to monitor for the information in the on-duration state.

Example 11

The method of any of examples 1 to 10, wherein waking up for the UE to receive the information in the on-duration state comprises: turning on a panel at the UE used to receive signals from the anchor transmission/reception point in the on-duration state; and turning on panels at the UE used to receive signals from the subset of the plurality of transmission/reception points to receive the information in the on-duration state.

Example 12

The method of any of examples 1 to 11, wherein the indication of the subset of the plurality of transmission/reception points comprises an explicit indication of indices of the subset of the plurality of transmission/reception points or an indication of transmission configuration indication states corresponding to the indices of the subset of the plurality of transmission/reception points.

Example 13

The method of example 1, wherein the at least one transmission/reception point comprises the plurality of transmission/reception points, and wherein the monitoring further comprises monitoring for wake-up signals from each of the plurality of transmission/reception points.

Example 14

The method of examples 1 or 13, wherein receiving the at least one wake-up signal comprises receiving wake-up signals from a subset of the plurality of transmission/reception points, the wake-up signals indicating the presence of information in the on-duration state and indicating the subset of the plurality of transmission/reception points from which the UE is to monitor for the information in the on-duration state.

Example 15

The method of any of examples 1, 13, or 14, wherein waking up for the UE to receive the information in the on-duration state comprises turning on panels at the UE used to receive signals from the subset of the plurality of transmission/reception points to receive the information in the on-duration state from the subset of the plurality of transmission/reception points.

Example 16

The method of any of examples 1 or 13 to 15, wherein turning on panels at the UE used to receive signals from the plurality of transmission/reception points to receive the information in the on-duration state from the subset of the plurality of transmission/reception points.

Example 17

The method of any of examples 1 to 16, wherein the indication of the at least one transmission/reception point of the plurality of transmission/reception points comprises an explicit indication of indices of the at least one transmission/reception point or an indication of transmission configuration indication states corresponding to the indices of the at least one transmission/reception point.

Example 18

The method of any of examples 1 to 17, wherein the information in the on-duration state comprises at least one of control information or data information.

Example 19

The method of any of examples 1 to 18, wherein receiving a wake-up signal configuration information comprises receiving a wake-up signal configuration from a base station.

Example 20

The method of any of examples 1 to 19, wherein the at least one transmission/reception point of the plurality of transmission/reception points from which the UE is to monitor for wake-up signals is a transmission/reception point associated with the base station.

Example 21

An apparatus comprising at least one means for performing a method of any of examples 1 to 20.

Example 22

An apparatus for wireless communications comprising a processor; and memory coupled to the processor, the processor and memory configured to perform a method of any of examples 1 to 20.

Example 23

A non-transitory computer-readable medium storing code for wireless communications, the code comprising instructions executable by a processor to perform a method of any of examples 1 to 20.

Example 24

A method for wireless communications, comprising: transmitting a wake-up signal configuration to a user equipment (UE), the wake-up signal configuration indicating at least one transmission/reception point of a plurality of transmission/reception points from which the UE is to monitor for wake-up signals; determining information to transmit to the UE via at least a subset of the plurality of transmission/reception points; and transmitting at least one wake-up signal to the UE prior to or at the beginning of an on-duration state in a discontinuous reception cycle via one or more of the at least one transmission/reception point, the at least one wake-up signal indicating a presence of the information in the on-duration state of the discontinuous reception cycle.

Example 25

The method of example 24, wherein the at least one transmission/reception point comprises a single, anchor transmission/reception point, and wherein the transmitting the at least one wake-up signal further comprises: transmitting a wake-up signal to the UE via the anchor transmission/reception point, the wake-up signal indicating the presence of information in the on-duration state.

Example 26

The method of example 24 or 25, further comprising: transmitting a control message in the on-duration state via the anchor transmission/reception point, the control message indicating the subset of the plurality of transmission/reception points from which the UE is to monitor for the information in the on-duration state.

Example 27

The method of any of examples 24 to 26, further comprising: transmitting a control message in the on-duration state via the anchor transmission/reception point, the control message indicating the subset of the plurality of transmission/reception points from which the UE is to monitor for the information in the on-duration state.

Example 28

The method of any of examples 24 to 27, further comprising: transmitting the information in the on-duration state via the subset of the plurality of transmission/reception points.

Example 29

The method of any of examples 24 to 28, further comprising: transmitting another control message indicating the subset of the plurality of transmission/reception points from which the UE is to stop monitoring for further information in the on-duration state.

Example 30

The method of any of examples 24 to 29, wherein the control message comprises a medium access control (MAC) control element (MAC-CE), a downlink control information (DCI) message, or a radio resource control (RRC) message.

Example 31

The method of any of examples 24 to 30, wherein the indication of the subset of the plurality of transmission/reception points comprises an explicit indication of indices of the subset of the plurality of transmission/reception points or an indication of transmission configuration indication states corresponding to the indices of the subset of the plurality of transmission/reception points.

Example 32

The method of any of examples 24 to 31, wherein the indication of the at least one transmission/reception point of the plurality of transmission/reception points comprises an explicit indication of indices of the at least one transmission/reception point or an indication of transmission configuration indication states corresponding to the indices of the at least one transmission/reception point.

Example 33

An apparatus comprising at least one means for performing a method of any of examples 24 to 32.

Example 34

An apparatus for wireless communications comprising a processor; and memory coupled to the processor, the processor and memory configured to perform a method of any of examples 24 to 32.

Example 35

A non-transitory computer-readable medium storing code for wireless communications, the code comprising instructions executable by a processor to perform a method of any of examples 24 to 32.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a wake-up signal configuration, the wake-up signal configuration indicating an anchor transmission/reception point of a plurality of transmission/reception points from which the UE is to monitor for wake-up signals, wherein the anchor transmission/reception point is associated with a first panel at the UE;
   monitoring for wake-up signaling from the anchor transmission/reception point based at least in part on the wake-up signal configuration, the wake-up signaling being for a discontinuous reception cycle;
   receiving at least one wake-up signal prior to or at a beginning of an on-duration state in the discontinuous reception cycle based at least in part on the monitoring, the at least one wake-up signal indicating a presence of information in the on-duration state;
   turning on the first panel at the UE used to receive signals from the anchor transmission/reception point based at least in part on receiving the at least one wake-up signal;
   receiving, in the on-duration state, a first control message from the anchor transmission/reception point using the first panel, wherein the first control message comprises an indication of a subset the plurality of transmission/reception points different from the anchor transmission/reception point for which the UE is to monitor for the information in the on-duration state, wherein the indication comprises an explicit indication of indices of the subset of the plurality of transmission/reception points or an indication of transmission configuration indication states corresponding to the indices of the subset of the plurality of transmission/reception points;
   turning on a set of second panels at the UE associated with the subset of the plurality of transmission/reception points to receive the information in the on-duration state based at least in part on the indication of the subset of the plurality of transmission/reception points;
   receiving, from the anchor transmission/reception point, a second control message indicating that the UE is to turn off the set of second panels at the UE used to receive signals from the subset of the plurality of transmission/reception points, wherein the second control message is a downlink control information message; and
   turning off the set of second panels at the UE based at least in part on receiving the second control message.

2. The method of claim 1, wherein waking up for the UE to receive the information in the on-duration state comprises turning on panels at the UE used to receive signals from the plurality of transmission/reception points to receive the information in the on-duration state.

3. The method of claim 1, further comprising:
   initiating an inactivity timer based at least in part on turning on the set of second panels at the UE used to receive signals from the subset of the plurality of transmission/reception points; and
   turning off the set of second panels used at the UE to receive signals from the subset of the plurality of transmission/reception points when the inactivity timer expires.

4. The method of claim 1, wherein the second control message comprises a medium access control (MAC) control element (MAC-CE), a downlink control information (DCI) message, or a radio resource control (RRC) message.

5. The method of claim 1, wherein the anchor transmission/reception point comprises the plurality of transmission/reception points, and wherein the monitoring further comprises monitoring for wake-up signals from each of the plurality of transmission/reception points.

6. The method of claim 1, wherein the information in the on-duration state comprises at least one of control information or data information.

7. The method of claim 1, wherein the wake-up signal configuration is received from a network entity.

8. The method of claim 7, wherein the anchor transmission/reception point of the plurality of transmission/reception points from which the UE is to monitor for wake-up signals is associated with the network entity.

9. A method for wireless communication, comprising:
   transmitting a wake-up signal configuration to a user equipment (UE), the wake-up signal configuration indicating an anchor transmission/reception point of a plurality of transmission/reception points from which the UE is to monitor for wake-up signals;

determining information to transmit to the UE via at least a subset of the plurality of transmission/reception points different from the anchor transmission/reception point;

transmitting at least one wake-up signal to the UE prior to or at a beginning of an on-duration state in a discontinuous reception cycle via the anchor transmission/reception point, the at least one wake-up signal indicating a presence of the information in the on-duration state of the discontinuous reception cycle;

transmitting, in the on-duration state, a first control message comprising an indication of a subset the plurality of transmission/reception points different from the anchor transmission/reception point for which the UE is to monitor for the information in the on-duration state, wherein the indication comprises an explicit indication of indices of the subset of the plurality of transmission/reception points or an indication of transmission configuration indication states corresponding to the indices of the subset of the plurality of transmission/reception points; and transmitting a second control message indicating the subset of the plurality of transmission/reception points from which the UE is to stop monitoring for further information in the on-duration state, wherein the second control message is a downlink control information message.

10. The method of claim 9, further comprising:
transmitting the information in the on-duration state via the subset of the plurality of transmission/reception points.

11. The method of claim 9, wherein the second control message comprises a medium access control (MAC) control element (MAC-CE), a downlink control information (DCI) message, or a radio resource control (RRC) message.

12. An apparatus for wireless communications at a user equipment (UE), comprising:
a processor, and
memory coupled to the processor, the processor and memory configured to:
receive a wake-up signal configuration, the wake-up signal configuration indicating an anchor transmission/reception point of a plurality of transmission/reception points from which the UE is to monitor for wake-up signals, wherein the anchor transmission/reception point is associated with a first panel at the UE;
monitor for wake-up signaling from the anchor transmission/reception point based at least in part on the wake-up signal configuration, the wake-up signaling being for a discontinuous reception cycle;
receive at least one wake-up signal prior to or at a beginning of an on-duration state in the discontinuous reception cycle based at least in part on the monitoring, the at least one wake-up signal indicating a presence of information in the on-duration state;
turning on a first panel at the UE used to receive signals from the anchor transmission/reception point based at least in part on receiving the at least one wake-up signal;
receive, in the on-duration state, a first control message from the anchor transmission/reception point using the first panel, wherein the first control message comprises an indication of a subset the plurality of transmission/reception points different from the anchor transmission/reception point for which the UE is to monitor for the information in the on-duration state, wherein the indication comprises an explicit indication of indices of the subset of the plurality of transmission/reception points or an indication of transmission configuration indication states corresponding to the indices of the subset of the plurality of transmission/reception points;
turn on a set of second panels at the UE associated with the subset of the plurality of transmission/reception points to receive the information in the on-duration state based at least in part on the indication of the subset of the plurality of transmission/reception points;
receive, from the anchor transmission/reception point, a second control message indicating that the UE is to turn off the set of second panels at the UE used to receive signals from the subset of the plurality of transmission/reception points, wherein the second control message is a downlink control information message; and
turn off the set of second panels at the UE based at least in part on receiving the second control message.

13. An apparatus for wireless communications, comprising:
a processor, and
memory coupled to the processor, the processor and memory configured to:
transmit a wake-up signal configuration to a user equipment (UE), the wake-up signal configuration indicating an anchor transmission/reception point of a plurality of transmission/reception points from which the UE is to monitor for wake-up signals;
determine information to transmit to the UE via at least a subset of the plurality of transmission/reception points different from the anchor transmission/reception point;
transmit at least one wake-up signal to the UE prior to or at a beginning of an on-duration state in a discontinuous reception cycle via the anchor transmission/reception point, the at least one wake-up signal indicating a presence of the information in the on-duration state of the discontinuous reception cycle;
transmitting, in the on-duration state, a first control message comprising an indication of a subset the plurality of transmission/reception points different from the anchor transmission/reception point for which the UE is to monitor for the information in the on-duration state, wherein the indication comprises an explicit indication of indices of the subset of the plurality of transmission/reception points or an indication of transmission configuration indication states corresponding to the indices of the subset of the plurality of transmission/reception points; and
transmitting a second control message indicating the subset of the plurality of transmission/reception points from which the UE is to stop monitoring for further information in the on-duration state, wherein the second control message is a downlink control information message.

* * * * *